United States Patent [19]

Fisher et al.

[11] Patent Number: 6,157,984
[45] Date of Patent: Dec. 5, 2000

[54] INTEGRATED CONTROLLER/PROCESSOR FOR DISC DRIVE HAVING DIRECT MEMORY ACCESS

[75] Inventors: Daniel S. Fisher; Stanton M. Keeler, both of Longmont, Colo.

[73] Assignee: Seagate Technology, LLC, Scotts Valley, Calif.

[21] Appl. No.: 08/856,648

[22] Filed: May 15, 1997

[51] Int. Cl.[7] .................................................. G06F 12/60
[52] U.S. Cl. ........................ 711/112; 711/113; 711/202; 395/500; 395/280
[58] Field of Search .................................. 711/112, 113, 711/202; 395/182.06, 500, 280; 438/632; 360/53, 98.01

[56] References Cited

U.S. PATENT DOCUMENTS

| | | | |
|---|---|---|---|
| 4,975,828 | 12/1990 | Wishneusky et al. | 364/200 |
| 4,979,055 | 12/1990 | Squires et al. | 360/69 |
| 4,979,056 | 12/1990 | Squires et al. | 360/69 |
| 5,261,058 | 11/1993 | Squires et al. | 395/275 |
| 5,307,471 | 4/1994 | Ishikawa | 395/280 |
| 5,369,345 | 11/1994 | Phan et al. | 318/561 |
| 5,402,200 | 3/1995 | Shrinkle et al. | 360/69 |
| 5,412,666 | 5/1995 | Squires et al. | 371/37.4 |
| 5,465,338 | 11/1995 | Clay | 395/310 |
| 5,473,573 | 12/1995 | Rao | 365/230.01 |
| 5,477,103 | 12/1995 | Romano et al. | 318/601 |
| 5,563,099 | 10/1996 | Grass | 438/632 |
| 5,586,306 | 12/1996 | Romano et al. | 395/500 |
| 5,696,931 | 12/1997 | Lum et al. | 711/113 |
| 5,715,418 | 2/1998 | Atsatt et al. | 711/202 |
| 5,812,755 | 9/1998 | Kool et al. | 395/182.06 |

OTHER PUBLICATIONS

SGS–Thomson Microelectronics, *ST10R100 Preliminary Specification* (May 1996), Edition 1.0, pp. 1–85.
SGS–Thomson Microelectronics, *ST10FERRARI Preliminary Specification*, (Jun. 1996), Rev. 1.2, pp. 1–20.
SGS–Thomson Microelectronics, *ST10FERRARI TIMINGS*, (Feb. 1996), pp. 1–21.

*Primary Examiner*—Do Hyun Yoo
*Assistant Examiner*—Nasser Moazzami
*Attorney, Agent, or Firm*—Flehr Hohbach Test Albritton & Herbert

[57] ABSTRACT

A single chip integrated disc/servo controller and processor (CPU) for a disc drive reduces timing overhead associated with processor/controller/memory communication paths, increases speed, reduces the number of ASIC components, and increases reliability. The processor has a core that can be customized and implemented with appropriate hard disc drive specific controller technology including code or algorithms. Timing overhead associated with the conventional multi-chip communication paths is reduced by the inventive structure as the single on-chip processor has direct access to a buffer memory through a buffer manager within the controller logic. This eliminates the pin and pad delays that are present in conventional implementations. This performance increase has a direct positive impact on disc drive performance generally, and more particularly on disc drive performance when running code from the buffer memory. The structure and method also reduce overhead when communicating with the controller logic, and reduces the delays and other timing overhead associated with accesses to individual storage registers, which are generally slower in the conventional multi-chip configuration than in the single-chip integrated device. Single-chip integration also advantageously reduces product cost by removing one of the ASICs that would otherwise be required for the disc drive electronics. The single chip integration provided by the invention also advantageously includes structural features implemented in sub-micron semiconductor manufacturing technology to provide the aforementioned integration.

11 Claims, 35 Drawing Sheets

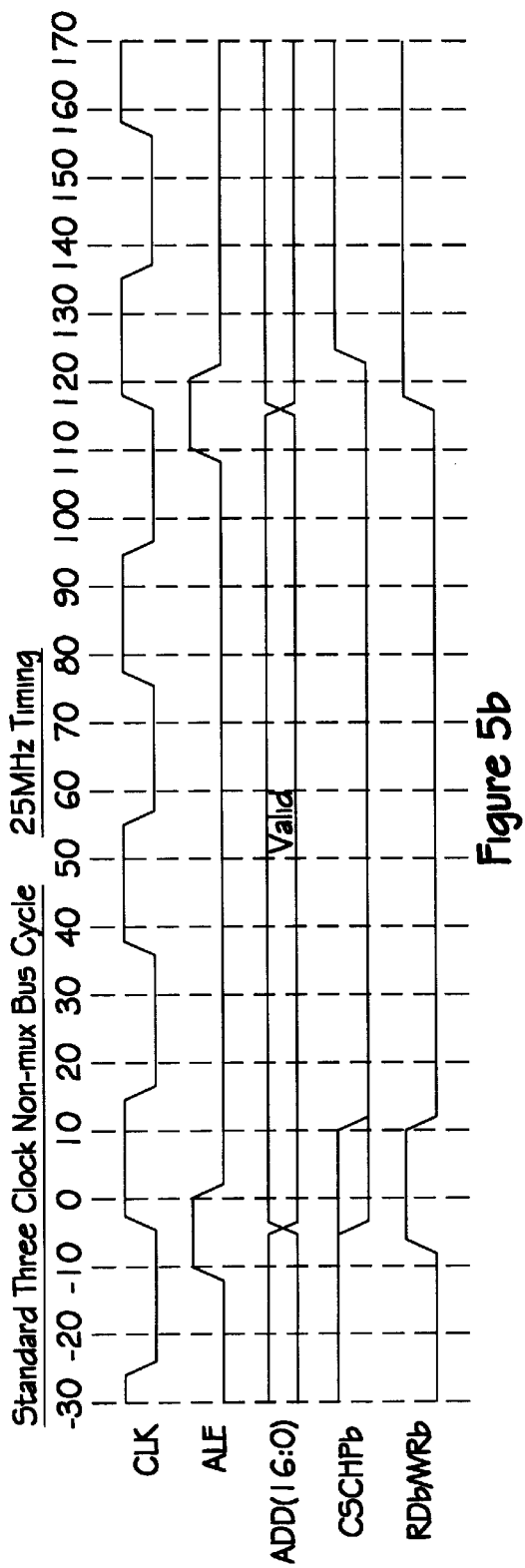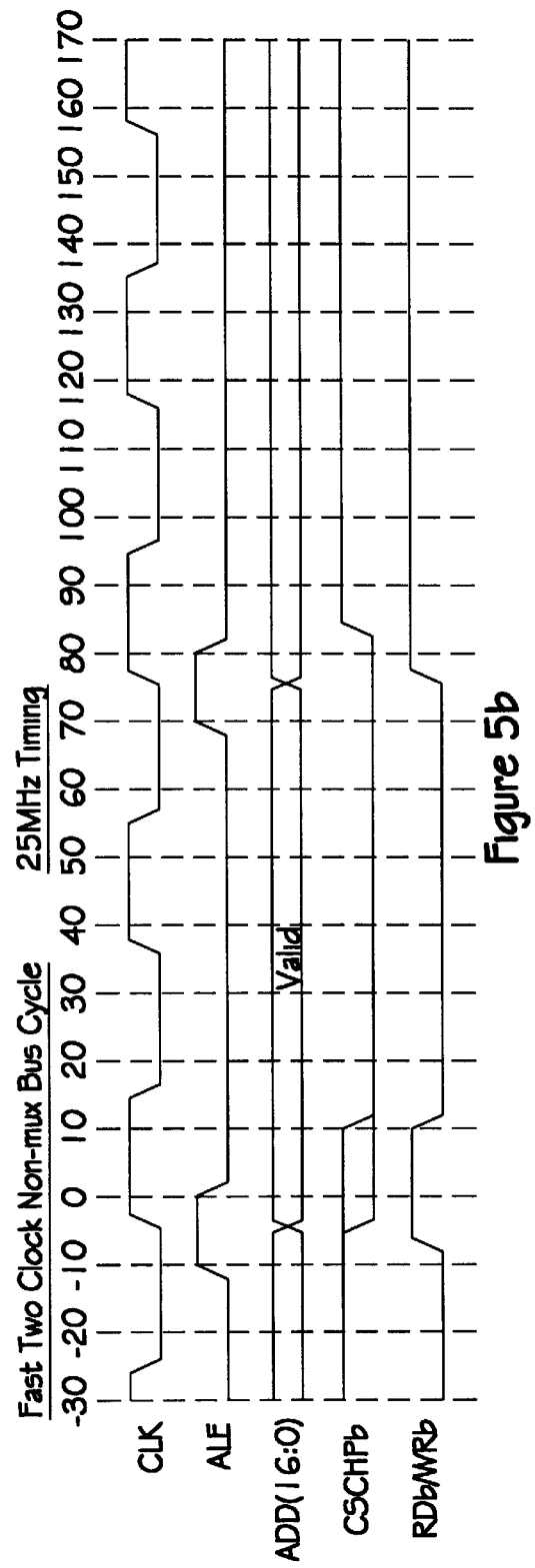

Connect to internals nets:
- A(16:0)
- CSBUFb
- CSCHPb
- CSEXTb
- WRHb
- WRLb
- RDb Sample Pad OUT FROM CPU → I$414 BUFT → PINx

IN TO MICRO BLOCK ← I$621 BUF

I$627 BUFT → CSROMb

Data Pad (x16)

I$622 BUF → D(0)
I$3 BUFT

I$625 BUF → FLASHWRb

TO SERVO CLOCK MUX → I$631 BUF → PCLK
I$630 BUFT

I$629 BUF → READYb

Figure 8C

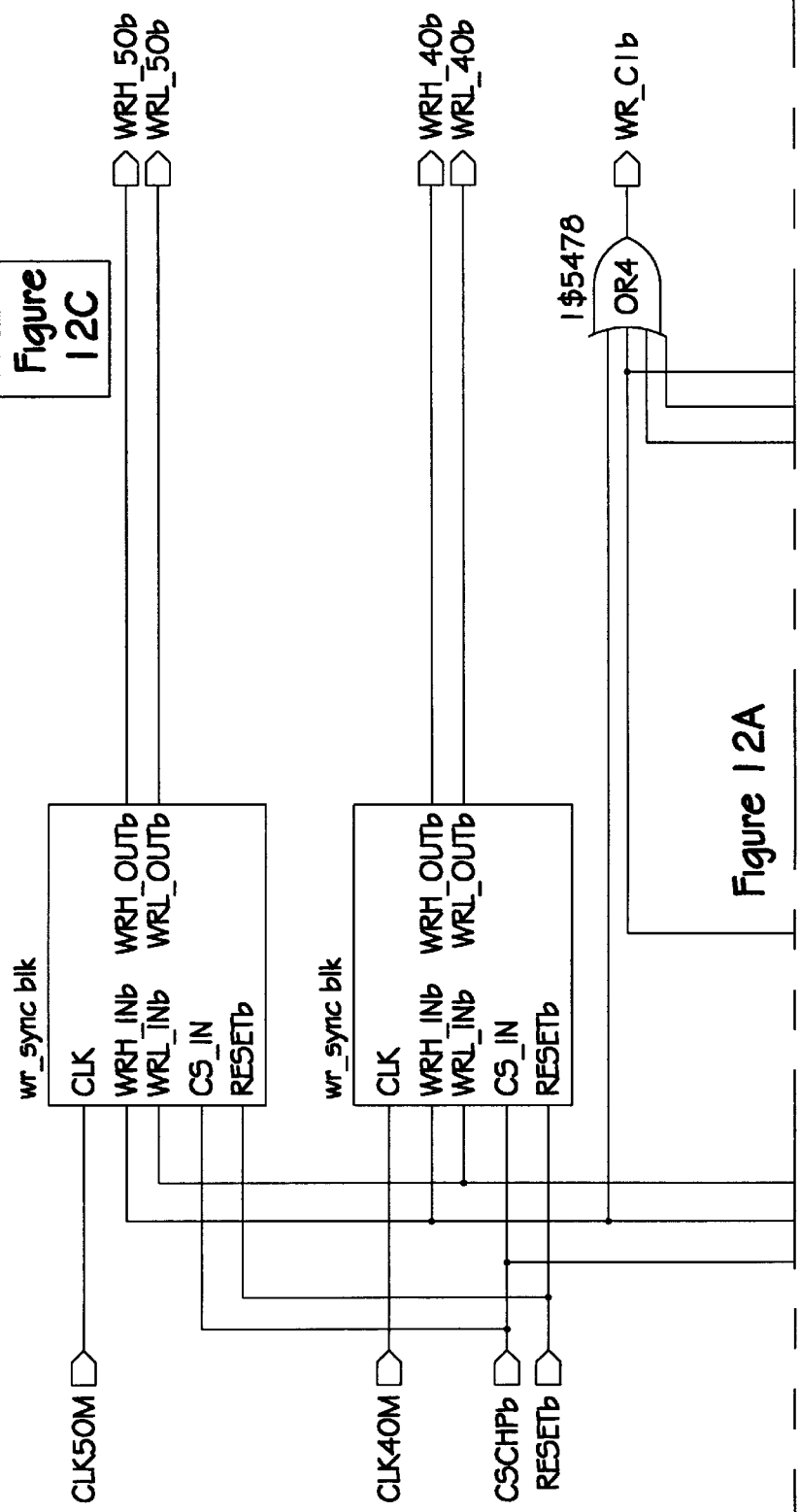

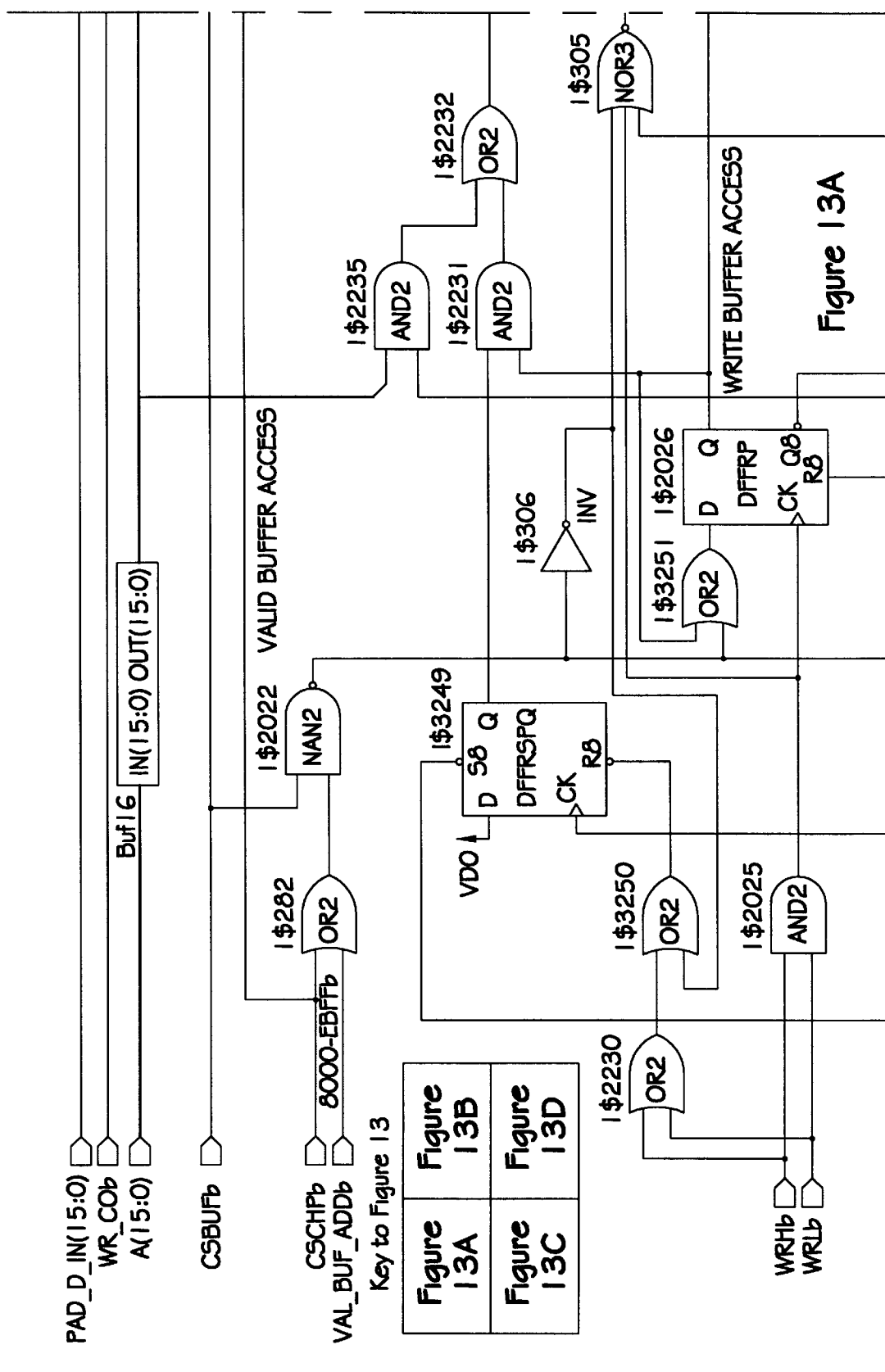

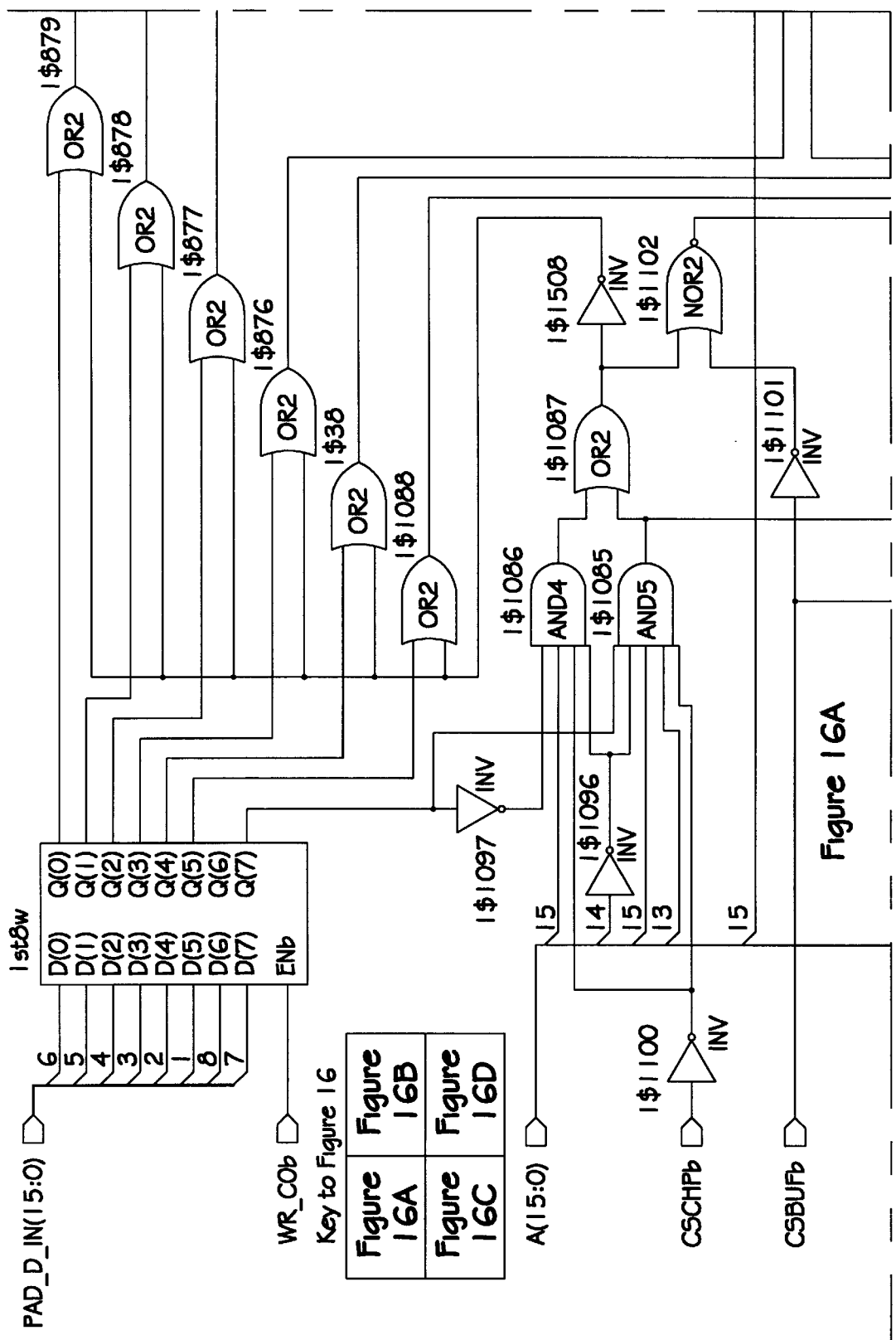

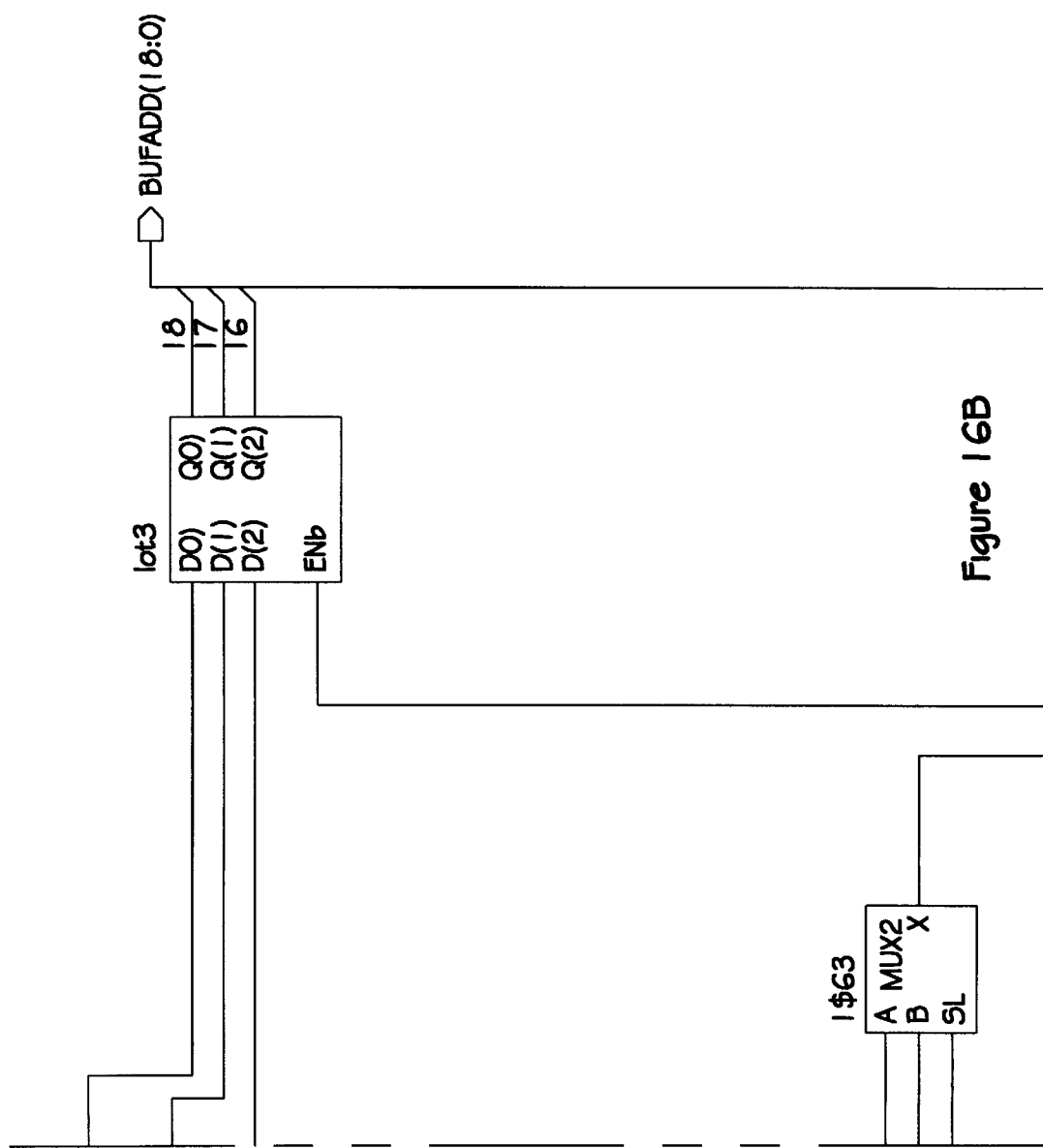

INTEGRATED CONTROLLER/PROCESSOR FOR DISC DRIVE HAVING DIRECT MEMORY ACCESS

FIELD OF THE INVENTION

This invention pertains generally to the field of computer disc drives, and more particularly to an integrated servo controller/processor for a computer disc drive that reduces timing overhead associated with memory access.

BACKGROUND OF THE INVENTION

There has been a continuous move in the computer industry generally to reduce the costs of computer systems, including both high- and low-end systems. Along with this overall cost reduction, there has been a continuous challenge in the disc drive industry to reduce the cost per megabyte of data stored, as well as increasing disc drive performance (e.g. faster access time) and increased storage capacity. This need for increased performance and higher capacity have been motivated by at least two factors. First, the increasing proliferation of digital data, including textual data, graphical data, and multimedia and audio-visual data, as well as the proliferation of information on the Internet and Worldwide Web which have resulted in a need for substantially more storage on each machine. Furthermore as operating systems and software application programs become more sophisticated and provide more features, the storage requirements for these programs and the data that they operate on have increased dramatically. Second, there has been a requirement for increased performance of disc drive systems generally. For example, computer systems that support multimedia functionality require reduced or fast access times to stored data so that graphical or imagery data can be accessed and presented to the user in real time. Program code must also be readily available so the execution is not inhibited by slow disc access. Where analog and/or digital data streams are to be captured from an external source, such as video cameras and the like, fast real time performance is mandatory, so that data streams are not corrupted or data is lost during real-time collection.

As consumer and professional demand for these low cost, high capacity, high performance non-volatile storage system grows, the pressure to create new and innovated solutions has been tremendous. One area where performance advantages may be realized along with a reduction in cost is in the area of the disc drive electronics. The advancement of semiconductor technologies has generally enabled disc drive designers and manufacturers to enhance the capabilities and performance of the integrated circuits while driving production and ultimately sales costs down. But these advancements have been limited.

A typical conventional constellation of electronics in a state of the art disc drive today has heretofore included four application specific integrated circuit (ASIC) devices. They are (1) read/write channel electronics, (2) servo power electronics, (3) processor or central processing unit (CPU), and (4) interface/disc/servo controller electronics. An example of the current generation of disc drive electronics and the associated disc drive hardware and interface is illustrated in FIG. 1 which is a diagram that shows the functional disc drive components, electronics, and their connectivity.

With further reference to FIG. 1, the disc drive electronics 30 includes a host interface 39 for connecting the disc drive to the host computer 80 (of any conventional design), and a Head Disc Assembly Interface (HDAI) 38 for connecting the disc drive electronics 30 to the head disk assembly (HDA) 82 itself including to read/write transducer head(s) 40 via wires 46, spindle motor 41, actuator motor 47, actuator arm 42, and other conventional disc drive components which are well known in the art and not discussed further. Many different types of disc drive are known in the art and the particular features of the disc drive illustrated in the figures is not meant to limit the applicability of the invention in any way. For simplicity and so as not to obscure the inventive feature, conventional components which would readily be understood to be present by those having ordinary skill in the art are not shown or described.

In this conventional implementation interface/disc/servo controller 31 provides an interface between the host computer and the disc drive with host interface 39. The interface is directly connected to buffer memory 32 which may store program code and/or data. Interface/disc/servo controller 31 is also connected by an 8- or 16-bit data bus 44 to CPU 34, code memory 35, and servo power electronics 36. Servo power electronics 36 is typically connected to the Hard Disc Assemblies (HDA) 82 via a direct connector connection 83 (typically implemented as a through hole or pressure connector) and through a plurality of FET switches 37 which control the spin motor. The HDA Interface (HDAI) 38 provides electrical connection between the Printed Circuit Board Assembly (PCBA) 84 including the internal disc drive electronics and HDA 82 including the disc drive internal mechanical and electromechanical components. Read/write channel electronics 33 includes Read Logic 33a, Write Logic 33b, and Servo Logic 33c, and is typically provided with a direct connection to interface/disc/servo controller 31 for transmitting user data to and from these devices via a 2-, 4-, or 8-bit NRZ data bus 42. A serial bus 43, is typically used to send configuration commands from the CPU 34 to the Read/Write Channel Electronics 33.

This conventional configuration provides for a CPU 34 that may operate by accessing program code from both the code memory 35 and from the buffer memory 32. However, CPU 34 and disc drive performance when running code from buffer memory 32 is degraded. The primary contributor to this performance degradation is the timing overhead associated with the multi-chip communication paths when the disc drive electronics 30 are implemented with chips. These multi-chip communication paths include: (1) the path from buffer memory 32 (chip A) to the CPU (Chip B) which passes through interface 31 (Chip C); and (2) the path from CPU 34 (Chip B) to code memory 35 (Chip D) over the bus 44.

FIG. 2 is a simplified diagrammatic illustration of a conventional three chip implementation for RAM core implementing buffer memory 32, Disc Controller Core 31, and CPU Core 34 configuration. In this configuration, the CPU 34 electrical connectivity path to and from the buffer memory 32 in the RAM core includes the following elements: (1) CPU logic 34, (2) first I/O pad 86, (3) first Bond wire 87, (4) first Lead Frame 88, (5) first PCBA trace 89, (6) second Lead Frame 90, (7) second Bond Wire 91, (8) second I/O pad 92, (9) Disc Controller logic 31, (10) third I/O pad 93, (11) third Bond Wire 94, (12) third Lead Frame 95, (13) third PCBA trace 96, (14) fourth Lead Frame 97, (15) fourth Bond Wire 98, (16) fourth I/O pad 99, and (17) RAM memory 32. In the circuit of FIG. 2, the non-logic elements may typically represent more than 60% of the time required to read or write the memory.

A major component of the electronic timing delays are the multi-chip communication paths caused by the large physical size of the integrated circuit (IC), I/O Driver (PADs)

which are required to drive the large capacitive load presented by the PCBA traces, device package leads, and PAD inputs/outputs of connected integrated circuits.

In these conventional configurations the processor or CPU requests access to buffer memory 32 indirectly through controller logic within the interface/disc/servo controller 31. (Direct communication or access between CPU 34 and buffer memory 32 is not supported in the conventional implementation.) This indirect access from the processor to the buffer memory through the controller logic 31 causes additional timing overhead since access to the buffer memory by the CPU can only occur over bus 44 through interface/disc/servo controller 31 and then to the buffer memory over RAM bus 49. The pad/pin delays, including I/O leakage, trace capacitance, and I/O capacitance, associated with multiple ASIC chips in the conventional implementation may also typically introduce additional communication timing overhead which degrades disc drive performance. These factors generally decrease performance and have a particularly negative impact on disc drive performance when running code from the buffer memory 32.

The conventional implementation which uses multiple chips (typically four ASIC chips) degrades performance, and the timing overhead associated with accesses to individual registers in the disc controller 31 and in buffer memory 32 further degrades performance as compared to a theoretical integrated device.

Therefore, it will be seen that there is a need for a disc drive controller and processor configuration which overcomes these limitations and provides communication pathways and structure with direct access to both registers in the Disc Controller 31 and in buffer memory 32, and furthermore a configuration which reduces the total chip count to minimize manufacturing cost and enhance reliability. These and other features and advantages are provided by the inventive structure and method described in detail hereinafter.

SUMMARY OF THE INVENTION

Structure and method are provided which integrate into a single chip, such as an application specific integrated circuit (ASIC), a disc servo controller for interfacing to a host computer and a disc drive associated micro processor or CPU so that there is only a single CPU in the disc drive electronics, and the timing overhead associated with communications paths is reduced. (The host computer has a separate CPU). The disc drive CPU has a processor core that can be customized and implemented with appropriate hard disc drive specific controller technology (e.g. code and/or algorithms). The single chip integration provided by the invention also advantageously includes structural features implemented in sub-micron semiconductor manufacturing technology (such as 0.5-micron semiconductor manufacturing technology) to provide the aforementioned integration.

Timing overhead associated with the communication paths in conventional multi-chip configurations is virtually eliminated by the inventive structure as the on-chip CPU now has direct access to the buffer memory through a buffer manager functional block within the inventive controller logic. This eliminates the pin and pad delays that occur in conventional implementations and the reduction or elimination in communication timing overhead represent approximately a 33% or better reduction as compared to conventional implementations. This performance increase has a direct positive impact on disc drive performance generally, and more particularly on disc drive performance when running code from the buffer memory.

The integration of the CPU with the disc/servo controller also reduces overhead when communicating to the controller logic, and reduces the delays and other timing overhead associated with accesses to individual storage registers, which are generally slower in the conventional multi-chip configuration than in the inventive integrated device.

The integration of the CPU with the disc/servo controller also advantageously reduces product cost by removing one of the ASIC packages (e.g. typically, reduce the number of ASICs from four to three) that would otherwise be required for the disc drive electronics. Reliability of the single ASIC which integrates the controller and the CPU would also be improved in comparison to the combined reliability of the two separate ASICs that would have been required in conventional implementations.

BRIEF DESCRIPTION OF THE DRAWINGS

FIG. 5*a* is an exemplary signal timing diagram for memory accesses in the conventional configuration.

FIG. 5*b* is an exemplary signal timing diagram for memory accesses in the inventive configuration showing the reduced access time.

DETAILED DESCRIPTION OF THE INVENTION

Figure 3:
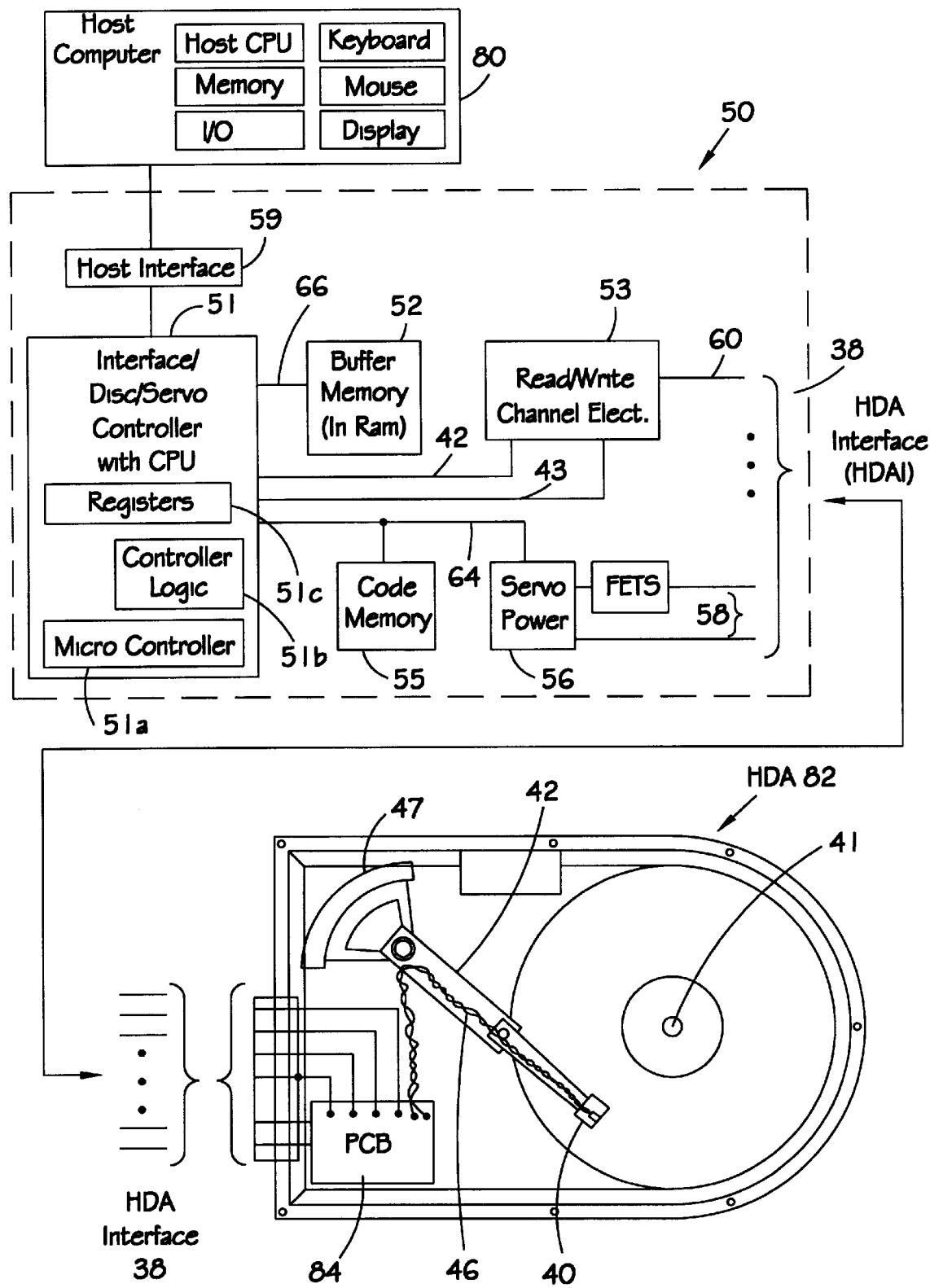
FIG. 3 is an illustration showing a functional block diagram of an embodiment of the inventive integrated controller and CPU particularly illustrating the integrated CPU and servo controller.

An embodiment of the components, including the disc drive electronics 50, which may be interposed between a disc drive such as a hard disc rotating magnetic disc, floppy disc, CDROM, and the like data or information storage media is now described relative to FIG. 3, which shows a block diagram of the electronics 50 which would be interposed and interconnected between the host interface 59 and the HDA Interface (HDAI) 38. These electronics include the Integrated Interface/Disc-Servo Controller and CPU (the combination hereinafter referred to as the Integrated Micro-Processor Controller or IMPC) 51 which includes a microprocessor and disc controller logic, a buffer memory 52 which is connected to IMPC 51 via communication line or bus 66, a code memory 55, and a servo power unit 56 (typically implemented with a separate ASIC device) connected to IMPC 51 via communication line or bus 64, and read/write channel electronics 53 connected between IMPC 51 and the read and/or write transducer 40 or other sensor within the HDA 82 itself. Although the term central processing unit (CPU) is used for convenience of description, it should be understand to include the general class of processors, micro-controllers, microprocessors, digital signal processor (DSP), and the like that are suitable for computer disc drive applications. Furthermore, for convenience in notation, we will use the terms "microprocessor" or "processor" to refer to the processor or CPU, and the term "controller" to refer to the disc servo controller component, so that the term processor/controller, controller/processor, or microprocessor/controller (IMPC) identifies the inventive integrated structure.

Figure 1:
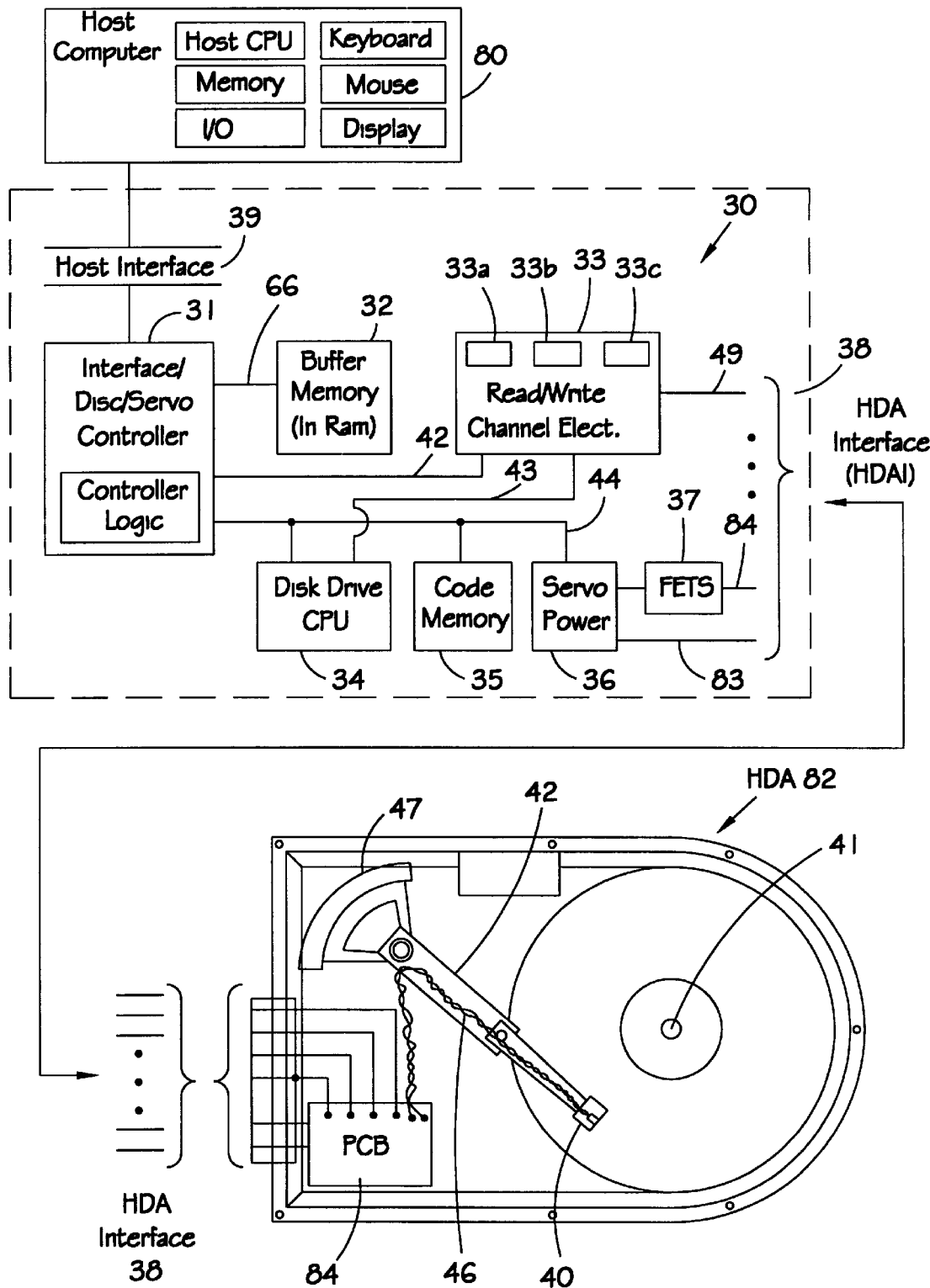
FIG. 1 is an illustration showing a conventional configuration of a disc/servo controller, CPU, buffer memory, code memory, read/write channel components, servo power unit, and FET switches.

The relationship between IMPC 51, buffer memory 52, and code memory 55 are significant in reducing the communication timing overhead associated with the conventional non-integrated separate CPU 34 and disc servo controller 31 such as that shown in FIG. 1.

Other aspects of the structure and method are described in related U.S. Pat. No. 5,784,216 entitled "A Method and Apparatus for Recording Defective Track Identification in a Disk Drive" by Daniel Zaharris filed Nov. 16, 1996, and Application Ser. No. 08/770,847 entitled "Data Sector/Servo Split Generator For a Disk Drive" by Stanton Keeler, Daniel Fisher, and John Mount filed Dec. 20, 1996; each of which are hereby incorporated by reference.

Other background material pertaining to magnetic recording and disc drives may be found in "The Complete Handbook of Magnetic Recording", 4th Edition by Finn Jorgensen, published by McGraw-Hill in 1996 (ISBN 0-07-033045-X) and the references cited therein, which is herein incorporated by reference.

With the inventive configuration, a request from the IMPC 51 to buffer memory 52 need not transit through a separate interface of the disc servo controller. The on-chip microprocessor core in the IMPC 51 is connected (or interfaced) through the microprocessor (CPU) interface 901 to provide direct access to the buffer manager 301 within the controller logic which eliminates pad and pin delays normally associated with conventional implementations. The inventive IMPC 51 may provide about a 33% reduction in communication timing overhead as a result of the direct access to the buffer manager and elimination of pin and pad delays. This performance increase has a direct beneficial impact on disc drive performance, generally, and more particularly when running code from buffer memory 52.

The pin/pad configuration of the present invention further reduces overhead by reducing the non-logic portion of the memory access pathway and timing. Recall that the non-logic elements represented more than 60% of the time respond to read or write memory.

Figure 2:
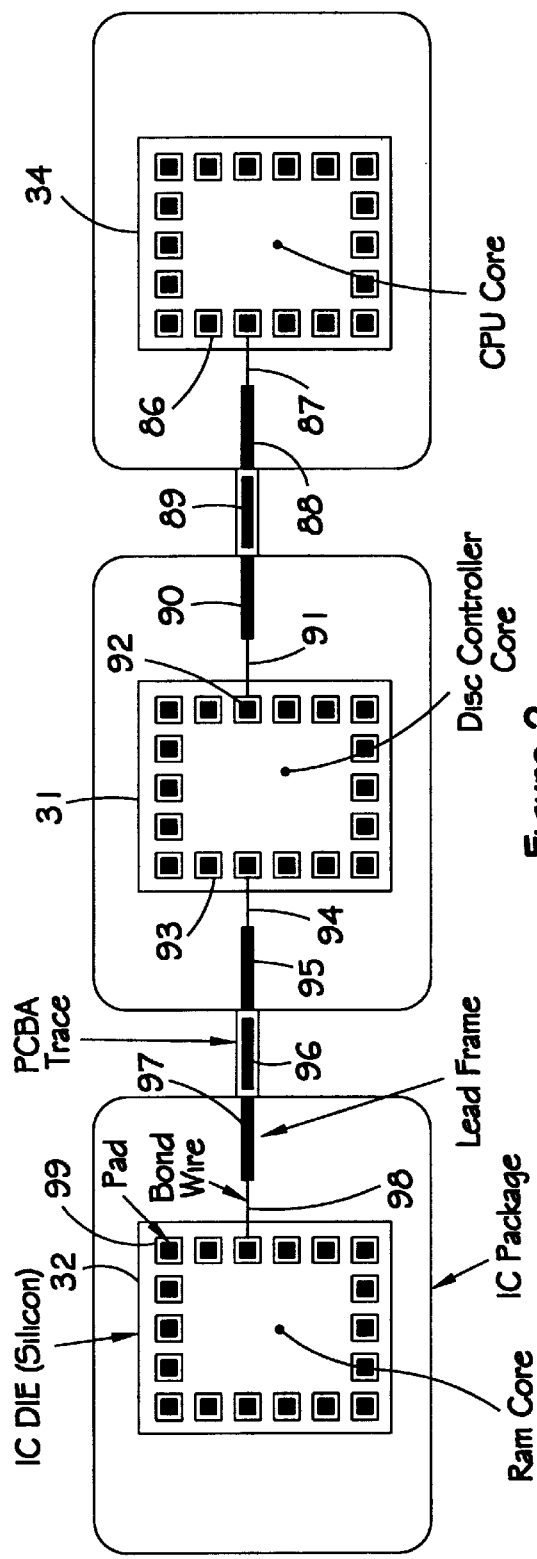
FIG. 2 is an illustration showing the multi-chip interconnections of CPU core, disc controller, and RAM memory in a conventional configuration.
Figure 4:
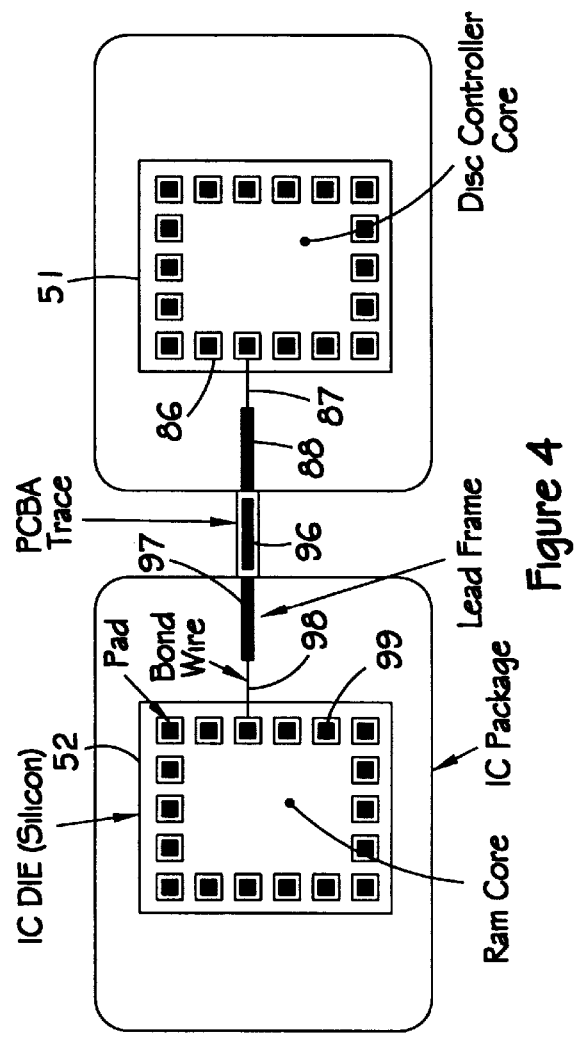
FIG. 4 is an illustration showing the chip interconnections of the integrated CPU and controller with the RAM memory in the inventive configuration.

It is desirable to reduce the overall time required to access the memory, and more specifically to reduce the contribution of the non-logic portion of the access time. In the simplified schematic circuit diagram of FIG. 4, the Disc Controller/CPU Core 51 electrical connectivity path to and from the buffer memory in the RAM core 52 includes only the following elements: (1) CPU logic, and, (2) Disc Controller logic with IMPC 51, (3) first I/O pad 86, (4) first Bond Wire 87, (5) first Lead Frame 88, (6) first PCBA trace 96, (7) second Lead Frame 97, (8) second Bond Wire 98, (9) second I/O pad 99, and (10) RAM memory 52. In the inventive circuit of FIG. 4, the non-logic elements represent approximately 43% of the time required to read or write the memory. For example, in the conventional configuration of FIG. 2, a single access to the memory will require a minimum of about 120 nanoseconds (nS) (at a 25 Mhz clock rate). By comparison, in the inventive configuration of FIG. 4, the single access time is reduced to about 80 nS under the same conditions, resulting in a performance increase of about 33%.

These timing differences are illustrated in the timing diagrams of FIG. 5. With respect to the timing diagram in FIG. 5a, there is shown a conventional external three-state bus cycle. Here, CLK is the clock, ALE is the Address Latch Enable Output which can be used for latching the address into extend memory or an address latch in the multiplexed bus modes, ADD(16:0) is the address, CSCHPb is the Chip Select Chip signal, and RDb/WRb are the Read/Write State Signals. The second clock cycle (between about 40 and 80 nS) where there virtually no activity is required so that there is at least a very high probability if not certainty that data or control communicated between the CPU 34 and the RAM 32 has traversed the connections between the CPU and RAM core, including the several pin/pads involved in the conventional configuration, and is available.

By comparison, the timing diagram for the integrated device is illustrated in FIG. 5b, and clearly shows the manner in which the second or middle clock cycle in FIG. 5a has been eliminated, thereby decreasing the time to read/write from about 120 nS total to about 80 nS total. The middle cycle is not needed because the connection is made directly between the RAM core 52 and the microprocessor 51a within the IMPC 51.

The integration of a microprocessor with disc servo controller also reduces overhead when communicating to the controller logic 51b. The integrated IMPC provides faster access to individual registers 51c within IMPC 51 and buffer memory 52 than the conventional separate two device implementations having separate CPU and controllers relative to accesses to individual registers.

Figure 6:
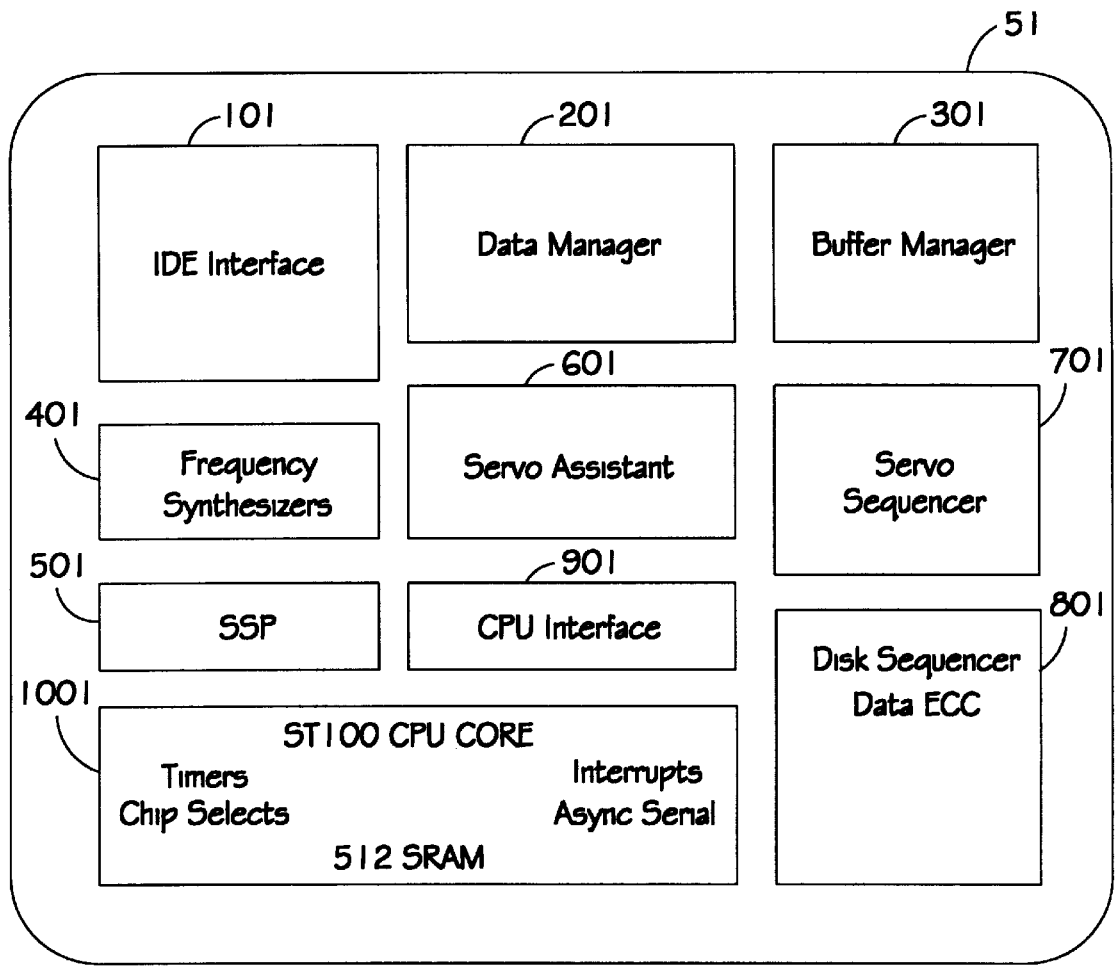
FIG. 6 is an illustration showing the major functional blocks of the integrated microprocessor and servo controller.

Characteristics of IMPC 51 are now described relative to FIG. 6 which shows a diagram of the major functional blocks within the IMPC 51. Further discussion of the connection between IMPC blocks is provided relative to FIGS. 7–16. It should be understood that only those components which are necessary to understanding the inventive structure and method are described with particularity. Conventional components and/or signals, characteristics of communication lines, busses, and the computer disc drive, and computer architectures generally, are not described as they are well known to workers having ordinary skill in the art.

IMPC Functional Blocks—Overview

The inventive IMPC 51, includes ten major functional blocks, generally implemented with electronic circuits, including: Microprocessor Core 1001, Microprocessor (or CPU) Interface 901, Data Manager 201, Buffer Manager or Buffer Controller 301, Servo Sequencer 701, Disc Sequencer and Data Error Correction Code 801, Servo Assistant and Sector Generator 601, Clock Generation circuitry including Frequency Synthesizers 401, Static RAM Array (SSP) 501, and an Interface 101 such as, for example, an AT or IDE interface. Each of these functional circuit blocks is described in greater detail below.

IMPC 51 in one embodiment, provides an integrated AT-interface/servo controller that provides a 16-bit AT-bus interface, 2-, 4-, or 8-bit non-returned to zero (NRZ) signal, and 16-bit non-multiplexed microprocessor interface.

One particular exemplary embodiment of the inventive IMPC 51 is packaged in a 176 pin, 24 millimeter×24 millimeter FTQFP package. Of course, the inventive structure is not limited to this physical package or pin configuration. In one embodiment of the invention the die size is approximately 42 sq/millimeter, and 0.5 micron triple metal CMOS technology is used in the implementation. Either ceramic or plastic encapsulation of the package may be used, as well as other conventional packages. It should be clearly understood that the invention is not limited to particular circuit fabrication or packaging or pin configurations and that modifications may be made to the conventional components of the disc drive electronics 51 without departing from the scope and spirit of the invention. Each of the functional blocks illustrated in FIG. 6 are now described in greater detail with reference to the figures. Signal names, where provided, correspond to those shown in the accompanying figures and are exemplary.

Microprocessor/CPU Core 1001

Those workers having ordinary skill in the art in light of the disclosure provided herein will appreciate that various microprocessor designs, structures, and processing methodologies may be used to practice the invention described herein. A suitable microprocessor 1001 for use with this invention advantageously has a core that can be customized and/or implemented with disc drive controller technology. By way of example but not limitation, the ST10R family of microcontrollers, including the ST10R163, ST10R100 (also referred to as "ST10"), and ST20 family of microcontrollers, manufactured by SGS-Thomson Microelectronics, Inc. (1860 Industrial Circle, Suite D, Longmont, Colo. 80501) provide microprocessors with customizable cores that are suitable cores 1001 for the IMPC 51. The structure and operation of the ST10R100 microprocessor is suitable for use with the inventive structure and method, and a more detailed description of it is provided in Appendix I which contains a technical description of the ST10R100, and has a publication date of May 1996 (Edition 1.0) by SGS-Thomson Microelectronics, Inc., and is incorporated by reference herein in its entirety. Although many features of the exemplary ST10R100 are described, those written having ordinary skill in the art, in light of this disclosure will appreciate that the invention does not require each of the features mentioned or described.

The ST10R100 microcontroller is a 16-bit microcontroller having a customizable core, optional internal ROM, internal RAM, interrupt controller and a peripheral event controller. The ST10 is a high performance 16-bit CPU with four stage pipeline. It normally operates with an 80 nanosecond instruction cycle time measured with a 25-MHz CPU clock. It also provides boolean bit manipulation facilities and has instructions to support high-level languages (HLL) and operating systems. It is a register-based design having multiple variable register banks, and up to 16 megabytes (more or less could be provided) of linear address space for code and data. On-chip RAM is also provided, typically between 0.5 Kbytes and 4 Kbytes.

The ST10 provides programmable external bus characteristics for different address ranges, and either an 8-bit or 16-bit external data bus. It supports either multiplexed or demultiplexed external address/data busses and has five programmable chip-select signals. The ST10 also provides 1024 bytes of on-chip special function register area. There is also a provision for up to 77 general purpose input/output (I/O) lines. The architecture of the ST10 combines advantages of both RISC and CISC processors, and of advanced peripheral subsystems in a balanced manner. These and other structures combine a high CPU performance capable of performing up to 12.5 million instructions per second, with high peripheral functionality and enhanced input/output capabilities. While these functions and capabilities are advantageously provided in a microprocessor core, they are not required for implementation of the inventive structure or method except as specifically provided in this disclosure. The microprocessor/microcontroller 2000 is fabricated on the same die as the controller logic.

The memory space of the ST10 is advantageously configured in a "Von Neumann" architecture which means that data memory, code memory, registers, and input/output ports, are organized within the same linear address space. In the ST10, this address space includes 16 megabytes of storage, and the entire memory space can be accessed either byte wise or word wise, and particular portions of the on-chip memory have also advantageously been made directly bit addressable. On-chip RAM is provided as a storage for user defined variables, for the system stack, for general purpose register banks, and for code if needed. A portion of address space is designated as Special Function Register area which includes word-wide registers which are used for controlling and monitoring functions of the different on-chip units. The ST10 provides for connection to external RAM and/or external ROM via an external bus. Write operations inside Program Memory may be executed by a program in the external (off-chip) or internal (on-chip) memory spaces.

In the ST10, external memory accesses may be performed by an external bus controller (EBC). The EBC can be programmed either to a "single chip mode" where no external memory is required or used, or to one of four different external memory access modes. The external bus controller controls communication between the ST10 core and various ports and pins.

The ST10 also provides programmable timing characteristics on the external bus interface including memory cycle time, memory tri-state time, length of ALE, and read/write delay. This programmability allows the user to adopt a wide range of different types of memories and external peripherals and to optimize timing to reduce unnecessary overhead. Different address ranges may be accessed with different bus characteristics. The ST10 provides for up to four independent address windows which may also be defined which allow access to different resources with different bus characteristics. The address windows are arranged hierarchically. Up to five external chip select (CS_N) signals (here, four windows plus default) can be generated in order to save external glue logic. Access to very slow memories is supported via a particular "ready" function, and bus arbitration is also available and allows a sharing of external resources with other bus masters. A slave mode is also provided and facilitates direct connection of the slave controller to another master controller without glue logic.

The ST10 core includes a four-stage instruction pipeline, a 16-bit arithmetic and logic unit (ALU) and dedicated Special Function Registers within general purpose registers.

These structures facilitate execution of most instructions in one machine cycle which requires about 80 nanoseconds with a 25-megahertz clock.

The ST10R has an interrupt time within a range of from about 200 nanoseconds to about 500 nanoseconds (in the case of internal program execution), so that the ST10 is capable of reacting very quickly to the occurrence of non-deterministic events. This architecture supports several mechanisms for fast and flexible response to service requests that can be generated from various internal or external sources. Any of these interrupt requests can be programmed for service by an interrupt controller or by the peripheral event controller.

ST10 interrupt service generally requires only a single cycle (which is stolen from current CPU activity) to perform a peripheral event controller (PEC) service. A PEC service implies a single data transfer between any two memory locations with additional increment of either the source or the destination pointer. PEC services are very well suited, for example, to support the transmission or reception of blocks of data such as occur for example in disc drives.

Data Manager 201

Data Manager 201 controls the flow of data into, and out of, buffer memory 52 by the host computer 71 and the hard disc drive 81. It manages segments of buffer memory 52 to guarantee that segment overrun and underflow conditions do not exist. It does this by counting the number of sectors that are transferred and informing the host computer and the disc drive when it is safe for them to read or write data.

Data Manager 201 uses sets of Read Sectors Available (RSAV), and Read Sectors Adjust (RSAD) to control host read releases; and Write Sector Available (WSAV), and Write Sector Adjust (WSAD) registers to control write releases during operation. Both read and write operation may operate in either a caching mode or a wrapping mode, and write operations may occur either without write cache, that is non-write cached, or with write cache enabled. Data Manager 201 also provides for disc releases.

Buffer Controller/Manager 301

Buffer Manager or Controller 301 performs all reads and writes from/to the Buffer Memory 52. It does this by arbitrating between requests from the disc drive assembly 82, host computer 80, error correction code of disc sequencer and data ECC 801, and microprocessor core 1001, and performing the operation requested by the particular one of these devices having the highest priority. Priority is determined by predefined rules. In one embodiment of the invention, the disc drive 82 is the highest priority device followed by the ECC 801, microprocessor core 1001, and host computer 80. The Buffer Manager 301 will supply the Buffer Memory addresses for disc drive 82 and host computer 80 accesses, while ECC 801 and microprocessor core 1001 accesses must supply a Buffer Memory Address for Buffer Memory accesses. In a particular embodiment of the invention, buffer controller 301 supports up to 512 kilobytes (or more) of SRAM. The SRAM speeds supported by this particular embodiment are 25, 35, 55, and 70 nanosecond(s) with corresponding transfer rate of 28.K, 22.2, 15.4, and 12.5 mega-transfers per second.

Servo Sequencer 701

Servo sequencer 701 is responsible for providing real time servo timing and data capture to assist microprocessor core 1001. The servo sequencer also includes logic to generate HARD sector marks and handle sector targeting and defective sectors in the ID-Less format. Servo Sequencer 701 includes several principal functional components: Servo Detector 705, Sector Generator 710, Split Generator 720, and Target Calculator 725. Servo Detector 705 is locked to the raw servo data written on the disc.

The Servo Detector logic 705 is started by the Start Search Operation which starts the grey clock in order to detect the Servo Address Mark (AM). After the Servo Address Mark is detected, the Servo Sequencer 701 starts the hardware for the detection and storage of any of the grey coded bits in the servo burst. Servo Sequencer 701 also produces the strobe windows that allow sampling of the position information, and can optionally operate a splash state window to allow for write splash after the last position burst. In one embodiment of the Servo Sequencer 701, programmable logic is provided to generate the signals at COMMIME, BRSTI, SGATE, PWRCYC*, and PWM at the servo output pins. These signals are locked in phase and frequency to the servo burst on the disc, and their respective duty cycles are programmable. The Servo Sequencer 701 includes hardware to produce the signals in the absence of a Servo Address Mark (AM). Servo sequencer 701 also includes logic to prevent the write gate output from being asserted incorrectly. Servo burst protection, microprocessor termination of write gate, and detection of write gate error conditions are provided for in the Servo Detector 705.

Sector Generator 710 provides Data Sector Marks (HRD_SCTR) and the timing signal to enable the split logic. This operation is performed with two counters, the first counter runs at the servo clock rate divided by six, and the second counter counts Data Sector Marks (HRD_SCTR) pulses.

Split generator 720 contains a counter that runs on the byte clock (byte clk) provided by Disc Sequencer 801. Split generator 720 is programmable with: (1) the Split Count Register (SPLITCNT) which is loaded with the number of data bytes minus one before the split occurs on the last data sector prior to the next servo burst; and (2) the Split Length (SPLITLEN) Register which is loaded with the number of data byte times required to delay over the servo burst on a split sector.

The counter starts counting when the Disc Sequencer 801 activates the Data Sync Byte Detected (DSYNC_DET) internal signal. The Disc Sequencer 801 will assert DYNC_DET when the sync byte is either written to or read from the disc 82. The counter continues counting until the value loaded into the Split CNT Register is reached, and at that time, if SPLIT_VALID signal is active, the split output signal to the Disc Sequencer 801 will be asserted. The counter is then reset and restarted. When the counter then reaches the count loaded in the split LEN register, the signal SPLIT will be deasserted. If SPLIT_VALID is not active when the counter reaches the split count value, it will be reset and will start counting at the next DSYNC_DET rising edge.

Target Calculator 725 determines the location of sector or sectors targeted for read/write transfer or transfers. The Target Calculator 725 can replace the function that the ID Header of other sectors formats may perform. At the heart of the Target Calculator 725 operation is the physical (PHYSCTR) counter which counts the sector (HRD_SECTR) pulses. This physical counter operates continually, independent of read/write transfers to the disc; it provides a physical address for each sector. Here the convention is used where sector 0 is the first sector after servo burst 0. The servo process contained in the microprocessor 1001 is assigned the task of monitoring the physical counter to ensure proper operation and resetting of the counter when servo burst 0 is encountered.

To determine the proper sector locations during read/write transfer, this physical counter is compared to another counter, the target sector (TARGSCTR) counter, which is loaded by the microprocessor 1001 prior to the read/write transfer with the first sector address. This TARGSCTR counter is incremented after every read or write of a sector is completed. If the two counters compare, the Target Calculator will allow the Disc Sequencer to perform the program read or write command. Defect skipping is accomplished automatically by the hardware using the contents of the SKIPSCTR register to ignore a skip sector. The compare process continues until the TARGSCTR counter compares to the STOPSCTR register which is programmed to stop the read/write process either because: (1) the end of the command is reached, or (2) because of an alternative-address defective sector.

The last target (LSTTARG) register is an additional register that is programmed to provide for transferring data across the PHYSCTR zero boundary. The TARGSCTR counter is compared to this LSTTARG register, and when equal, the TARGSCTR counter is automatically reset to zero. Normal operation then continues. This mode of operation is important in allowing read/write transfers to cross the servo burst zero/PHYSCTR zero boundary. This allows "sector skew" necessary for improved performance during sequential read/write transfer across head switches and single track seek. This block also has the optional ability to pause read/write operation based on the buffer not ready indication.

Target calculator 725 also contains a programmable read/write timeout counter (RWTMOUT) which can timeout when enabled Disc Sequencers stops issuing sector releases to Data Manager 201. This programmable read/write timeout counter will decrement on every servo address mark, but will be reloaded to the programmable value whenever the Disc Sequencer 801 releases a sector to Data Manager 201. If the counter reaches zero, the Disc Sequencer 801 will be stopped.

Servo Assistant 601

Servo system block 601 assists microprocessor core 1001 in performing signed 16/32-bit integer or fractional arithmetic. In particular, servo assist 601 assists the microprocessor in performing multiply, accumulate, shift, rotate, add, and subtract arithmetic operations.

Disc Sequencer and Data ECC Block 801

Disc Sequencer 801 places a structure on the data stream exchanged with read channel 53. The disc sequencer 801 interfaces with the Sector Generator 820, Data Manager 201, Buffer Manager 301, and Data ECC 810 blocks within the Disc Sequencer 801 block. A Register Interface is also provided to microcontroller 1001. These relationships are illustrated in the accompanying figures and particular show the manner in which the Disc Sequencer interfaces to the Sector Generator, Data Manager, and ECC. More particularly, Disc Sequencer 801 has an interface comprising a bidirectional communication link with sector generator 820, a bidirectional communication link with Data Manager 201, a bidirectional communication link with ECC block 810, and a bidirectional communication link with Buffer Manager 301 through ECC 810.

Sector generator 820 generates a sector pulse to indicate the start of each sector, and a servo split signal which indicates that the Sequencer 801 should stop reading/writing while the servo information is passing under the disc drive 82 transducer head 40.

Data manager 201 provides data buffers to Sequencer 801 during disc read and write operation. Sequencer 801 will not read or write a sector unless a buffer is available. Sequencer 801 will release the buffer to the Data Manager 201 when it is finished with the transfer.

Buffer Manager 301 provides access to the external RAM buffers. Sequencer 801 requests access to the Data Buffer from the Buffer Manager 301. When a buffer cycle is granted to Sequencer 801, the buffer address is provided by the Disc Buffer Pointer within Buffer Manager 201. The buffer data is provided to/from Disc Sequencer 801 through ECC block 810.

The data ECC block 810 provides error detection and correction services on the data being read from and written to the disc 81. Each sector is protected with separate error correction code. Error correction coding (ECC), of which there are many know implementations, is well known and not described further.

The NRZ interface provides 2-bit, 4-bit, and 8-bit interfaces to the read channel 53 in order to provide data. Larger interfaces could also be provided. Data is clocked into or out of Sequencer 801 by a Reference Clock provided by the Read channel 53. On write operation, Sequencer 801 also provides a write clock that is sourced by the signal RCLK, and phase corrected to match the output data. In one embodiment of the invention, during byte mode, there is no write clock, and the write clock output is shared with NRZ.

Functionally, Disc Sequencer 801 supports two basic operations: right sector and read sector. Each of these operations can function in a multi-sector mode where the operation is repeatedly executed until a program counter expires.

As already mentioned, many techniques for error correction code, ECC, are known in the art. In general, an error correction code is used to protect the data written to the disc. Data written to the disc is passed through the code generator and parity check for ECC bytes are appended to the end of the data field. When the data is read back from the disc, the data and ECC bytes are passed through a decoder which checks for errors in the data. If any errors are found, they may then be corrected by the hardware or firmware. Error correction involves some arithmetic computation to derive vectors which identify the errors and the location. The data ECC block may then access the data in the buffer in order to correct the errors. The number of errors that may be corrected and the probability of undetected errors is dictated by the choice of the error correction code. Codes may be implemented which can detect and correct errors, and other codes can be used solely for error detection, not correction. For example, such code which is based on a Reed-Solomon code and only detects errors is referred to as the integrity check for ICO. The error correction coding is interposed between disc sequencer 701 and buffer manager 201 for read and write operations. The particulars of error correction ECC decoding IC check, IC encoding and ECC encoding, and the operation of the first in first out buffers are well known in the art and are not described further.

Clock Generation Block and Frequency Synthesizer 401

The inventive integrated controller/CPU, IMPC 51, includes an oscillator cell that connects to an external fixed frequency crystal, here for example, a 20 megahertz crystal oscillator. The output of the oscillator is input to two frequency synthesizers. The first frequency synthesizer multiplies the 20 megahertz crystal output to 120 megahertz or 160 megahertz frequency, and the second frequency synthesizer multiplies the 20 megahertz clock to 200 megahertz.

The various clock generation unit output signals are provided to buffer manager 301, data manager 201, microprocessor interface 901, and disc sequencer 801 which receive an output from the 200 megahertz synthesizer. AT interface 101 receives an output from the 200 megahertz frequency synthesizer. Servo sequencer 701 receives two different outputs from the 120/160 megahertz synthesizer and an output from the 200 megahertz synthesizer and buffer manager 301 receives a clock signal from buffer manager clock (BM CLK) derived from the 200 megahertz output of the 200 megahertz synthesizer.

AT Interface Block 101

The AT or ATA interface block contains the ATA task file for interfacing to an AT device. This block includes two state machines that are used to automate the read and write transfers to host device 80. These two state machines are further controlled by logic that keeps track of data available in the buffer.

IMPC 51 is preferably equipped with an "auto read" feature, which when enabled at the successful completion of a read command, the next sequential address is loaded into the read sequential registers. If the next command is a read command and the new command task file matches the read sequential register, then the read is started by the hardware automatically after the expiration of the between sectors delayed timer. After completion of a successful read, the read sequential registers are reloaded with a new value. If wrapping is enabled with the auto read function, it is then possible to transfer the entire disc without microprocessor intervention provided that all host requests are sequential in nature.

If another command besides a read command is received, the auto read is unarmed until the next unsuccessful read command. Two status bits are provided to the microprocessor. One status bit is the auto read command in progress. This bit is set when the auto read is started so that the microprocessor knows that it is not required to set up anything for the current command. If on a new command, this bit is not set, then the second status bit, auto read armed, can be used to determine how to log off the current status of the buffer. If the auto read on the bit was set and the buffer was wrapping, then the read sequential registers contain the starting cylinder, head, and sector of the buffer segment. If the arm bit is not set, then the last auto read was not completed successfully and the start location of segment can either be thrown out or calculated by the read sequential registers plus the read transfer count. In either case, if the buffer was not warping, then the current segment information is correct.

In one embodiment of the invention, the Host FIFO is an eight-word first-in first-out bidirectional RAM and controller. This embodiment of the FIFO contains logic to interface to both the ATA and the buffer manager 301 blocks. On data writes from the host 80, the FIFO gives a FULL and an almost full signal, or if DMA Write then the "almost full" signal is replaced by "full-2" to the ATA block 101 for data flow control, and the ATA block 101 gives a pulse for each word written to the FIFO for the buffer manager 301. On data reads to the host 80, the FIFO gives buffer full, buffer empty, and buffer almost empty signals to the ATA block 101 for data flow control, and the ATA block 101 gives a load signal to the buffer manager to fetch the first eight words from and thereafter a pulse for each word that is requested.

As described earlier with respect to clock generation block 401, the clock generation provides clock signals of various frequencies. A clock buffer or buffers is advantageously provided to: 1) take the 40 MHz clock generated by the synthesizer block and apply the first stage of buffering for each of the blocks that use it, 2) it takes the 50 megahertz generated by the synthesizer block and applies the first of buffering for each of the blocks that use that 50 MHz clock, 3) it provides glitch free switching between 40 MHz and 50 MHz clocks on the unbuffered clock generated for the microprocessor core 1001, 4) it multiplexes an emulation clock in the microprocessor core 1001 during emulation, where emulation is desired, and 5) it detects when the IMPC 51 is being put into emulation mode and configures a port as an input during such emulation to force that port into tri-state mode.

The buffering strategies for clock signals is two stage. The first stage occurs in this block, and the second stage for buffering occurs within the block which is actually going to use the clock. For all blocks except the XBUS and INTERFACE, the buffering is implemented using inverters at both stages. The XBUS interfaces uses straight buffers. The SERVO may also require a straight clock. As is known in the art, the level of buffering required for each block may be dependent on the particular information, and may be determined by running simulations. Interfaces, conventionally known, and different from the AT or ATA interface may alternatively be provided.

Microprocessor Interface 901

Figure 7:
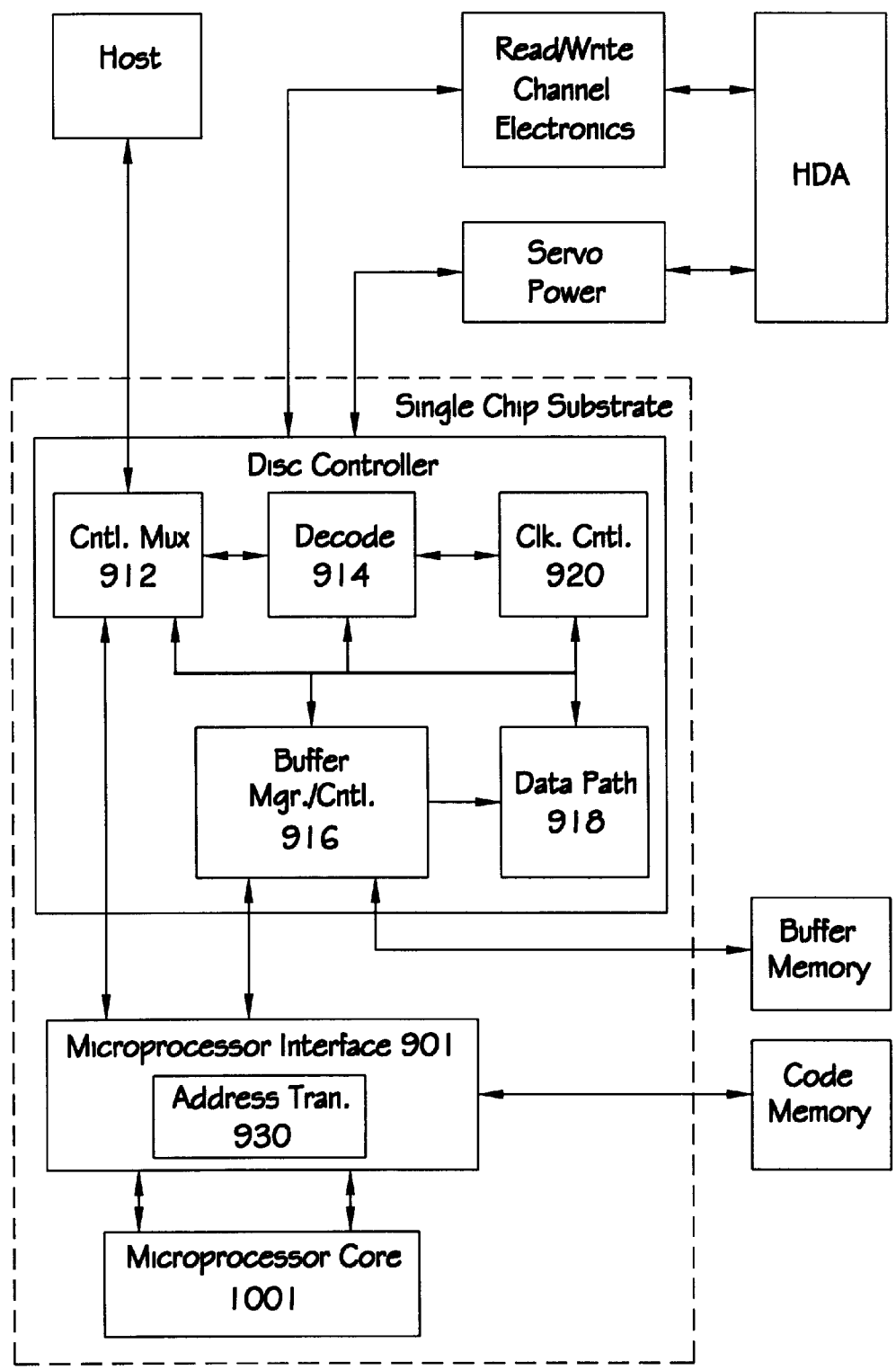
FIG. 7 is a functional block diagram of functional components of an embodiment of the inventive structure.
Figure 8A:
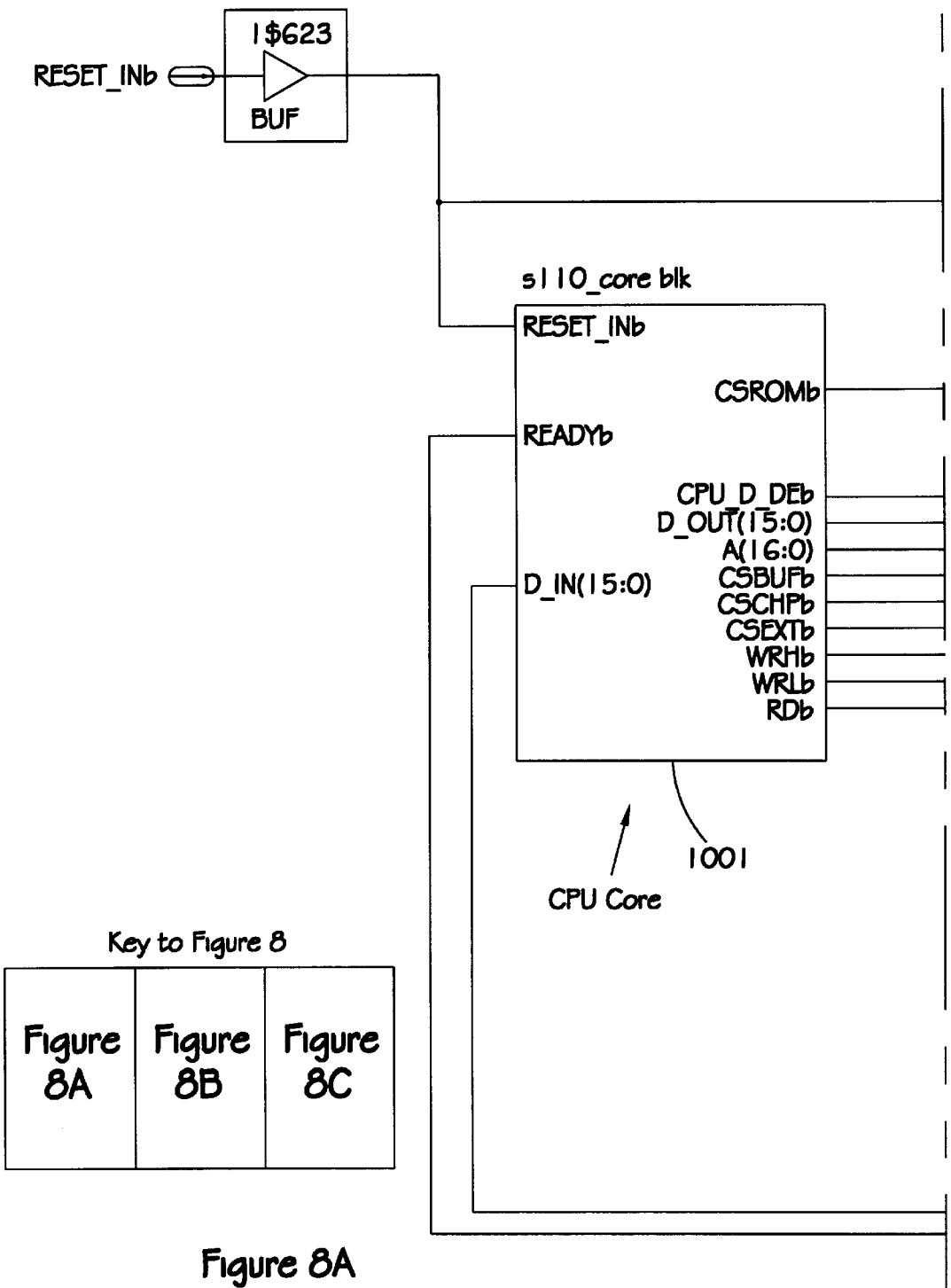
FIG. 8 is an illustration showing the relationship between and selected signal paths between the CPU Core 1001 and the microprocessor interface 901, as well as other signals for the embodiment illustrated in FIG. 7.
Figure 8B:
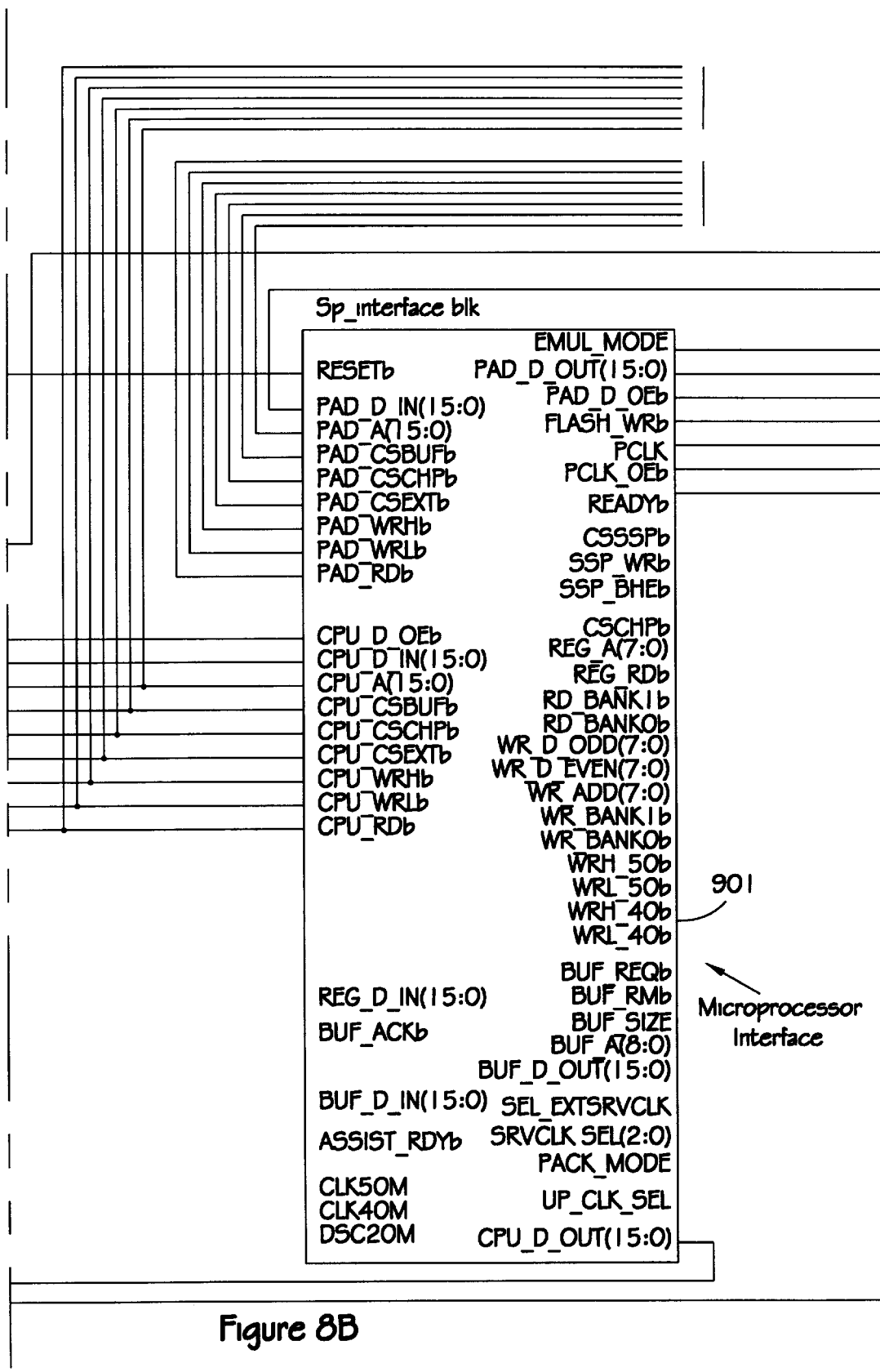
Figure 9A:
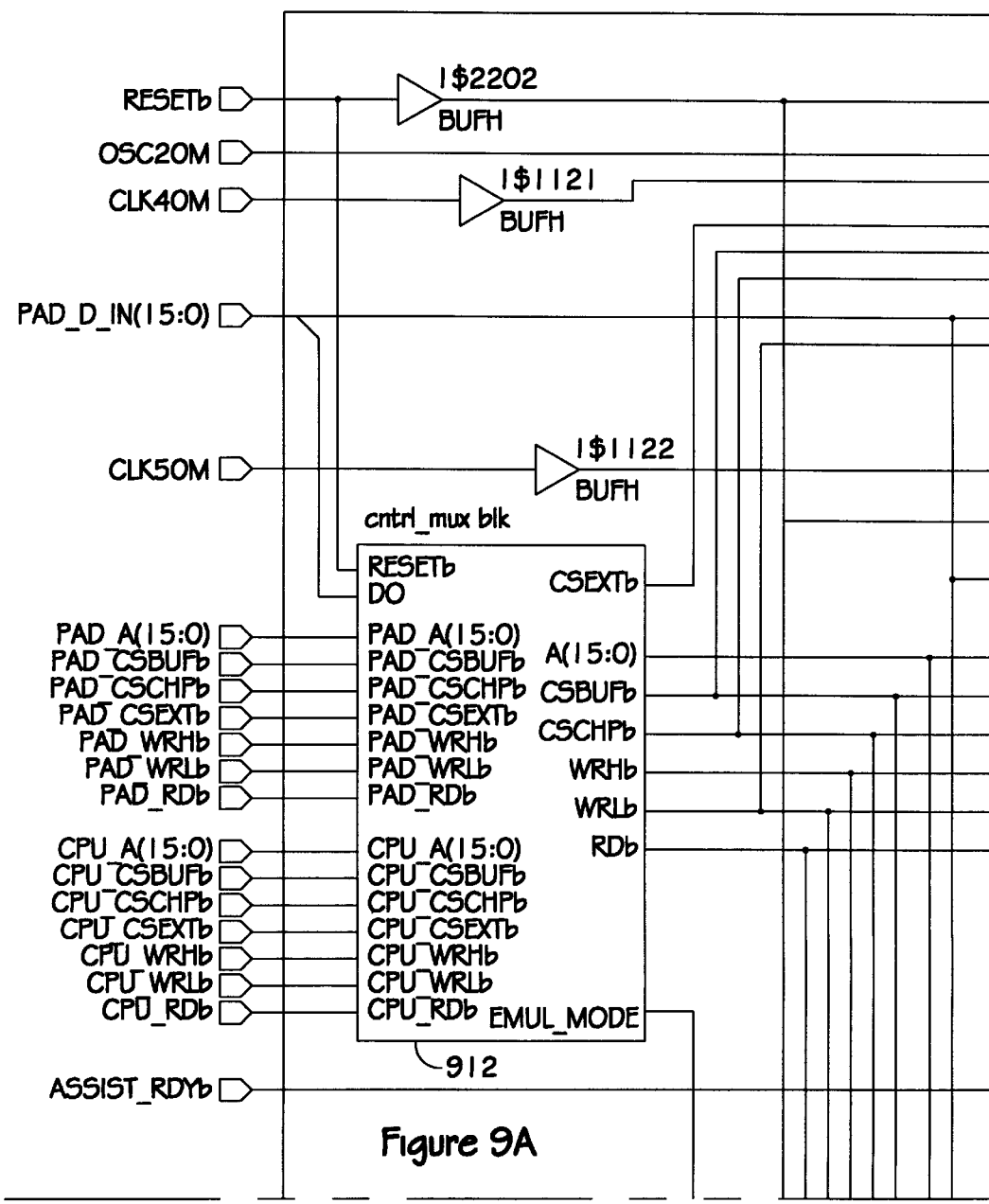
FIG. 9 is an illustration showing details of an embodiment of the microprocessor interface functional block for the configuration in FIG. 8.
Figure 9B:
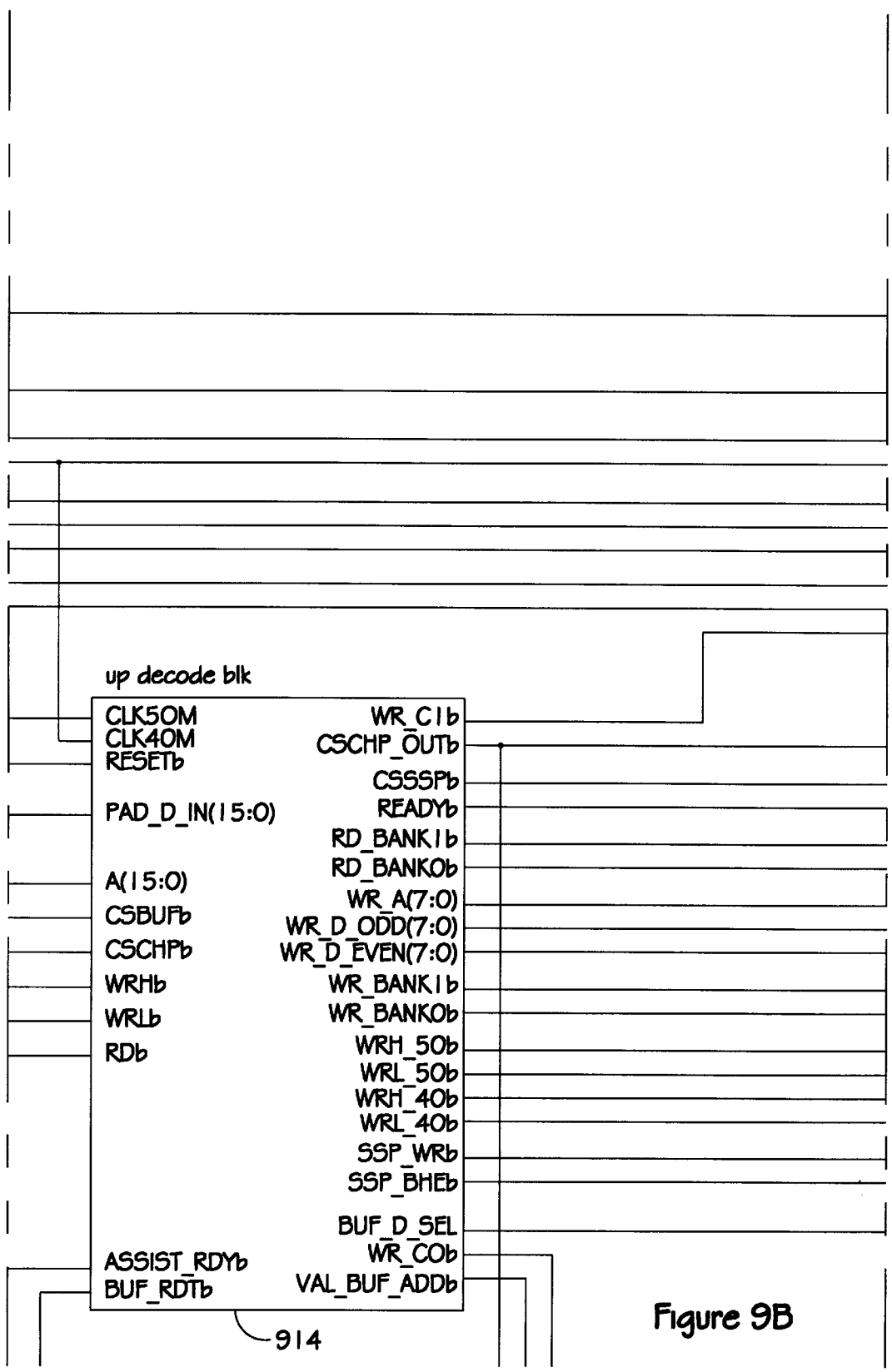
Figure 9C:
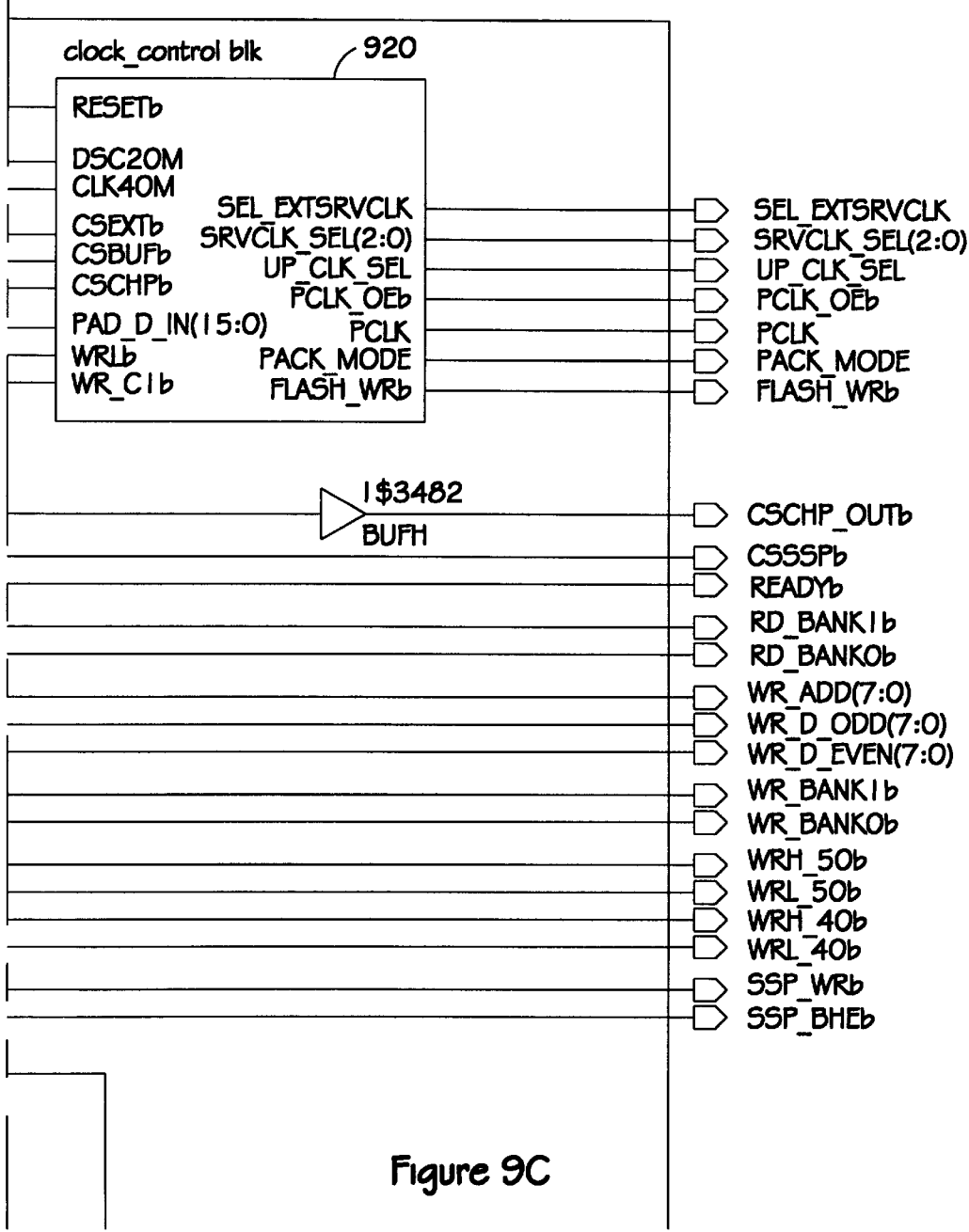
Figure 9D:
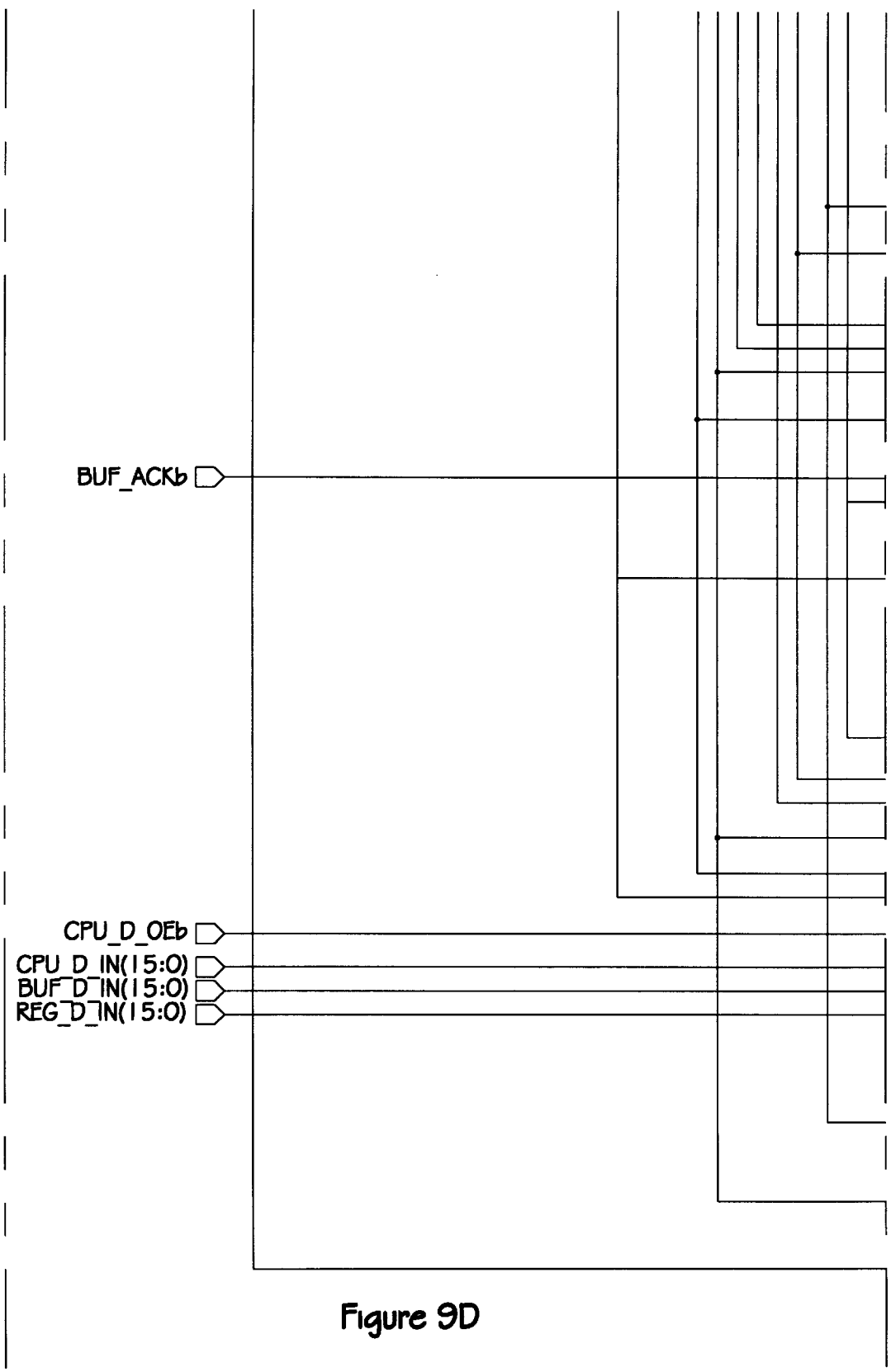
Figure 9E:
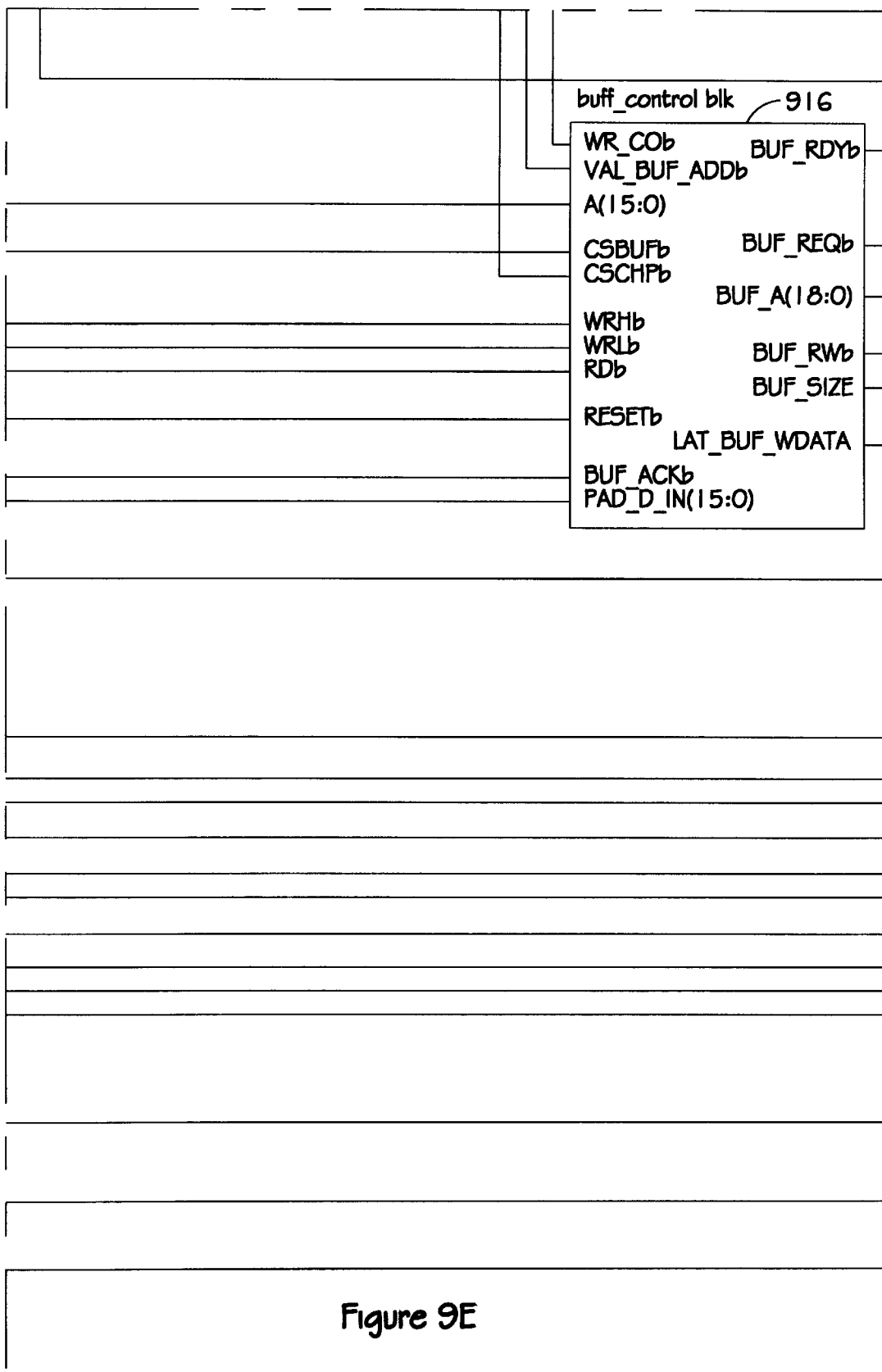
Figure 9F:
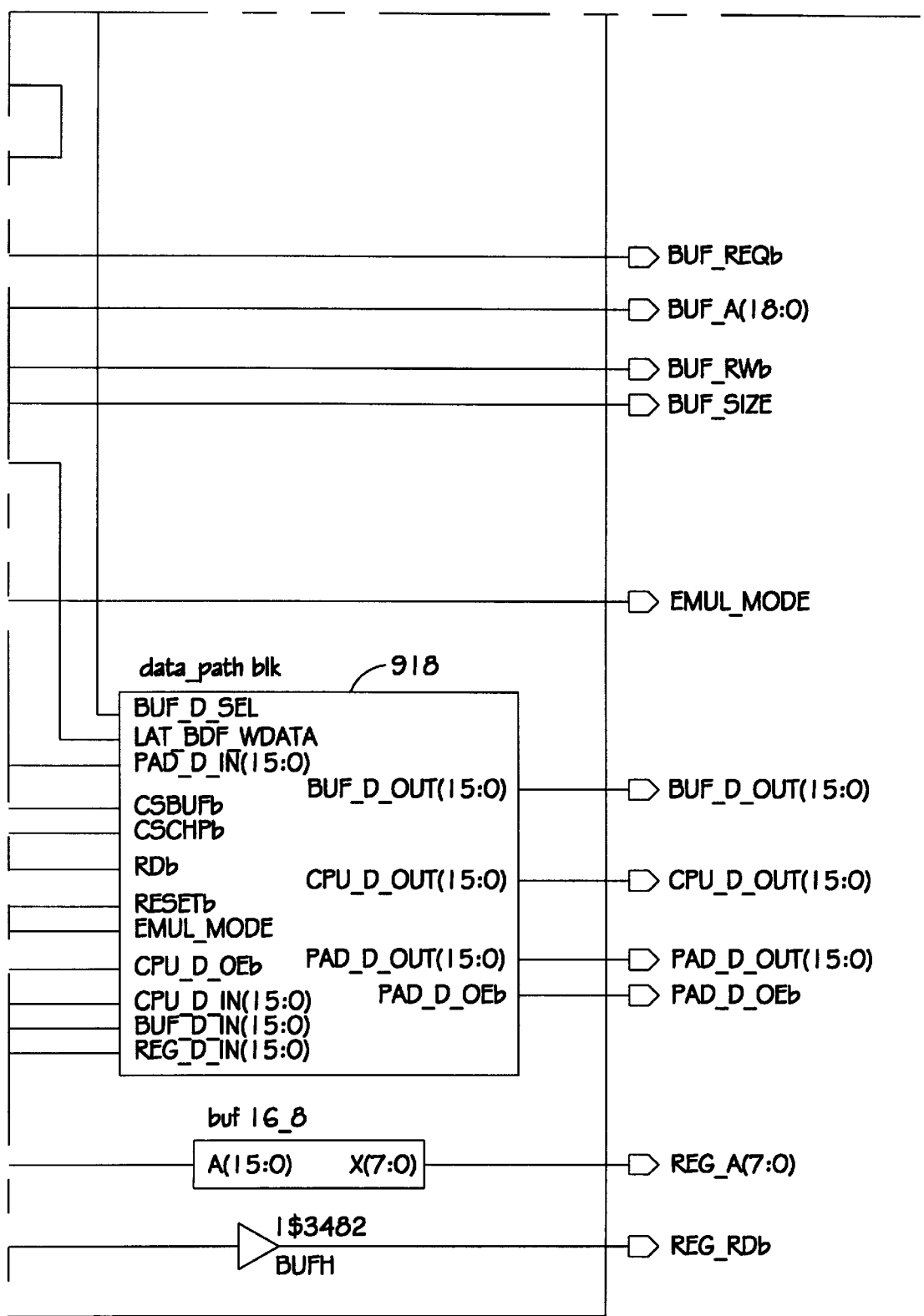
Figure 10A:
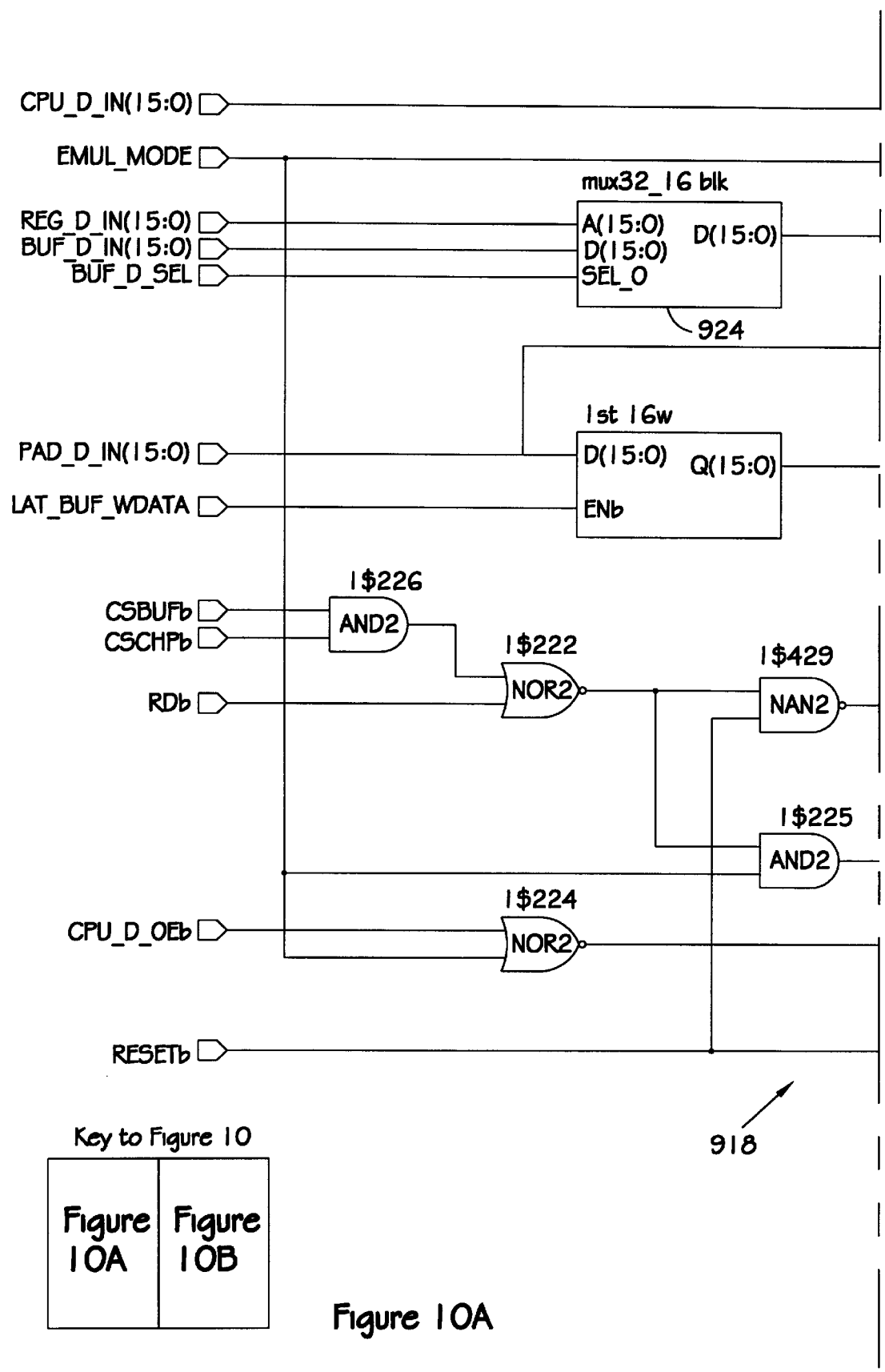
FIG. 10 is an illustration showing details of an embodiment of the data path (918) functional block.
Figure 10B:
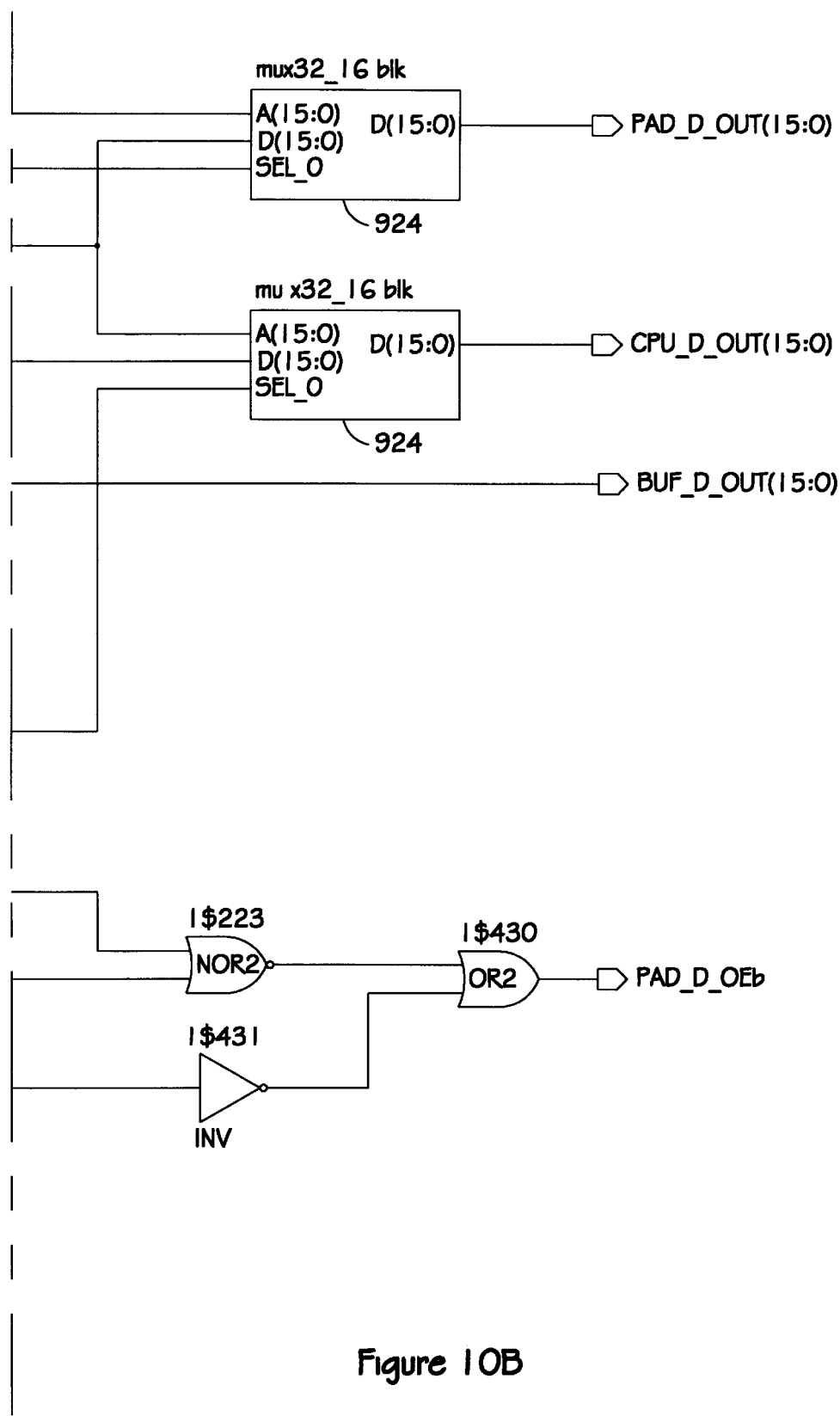
Figure 11A:
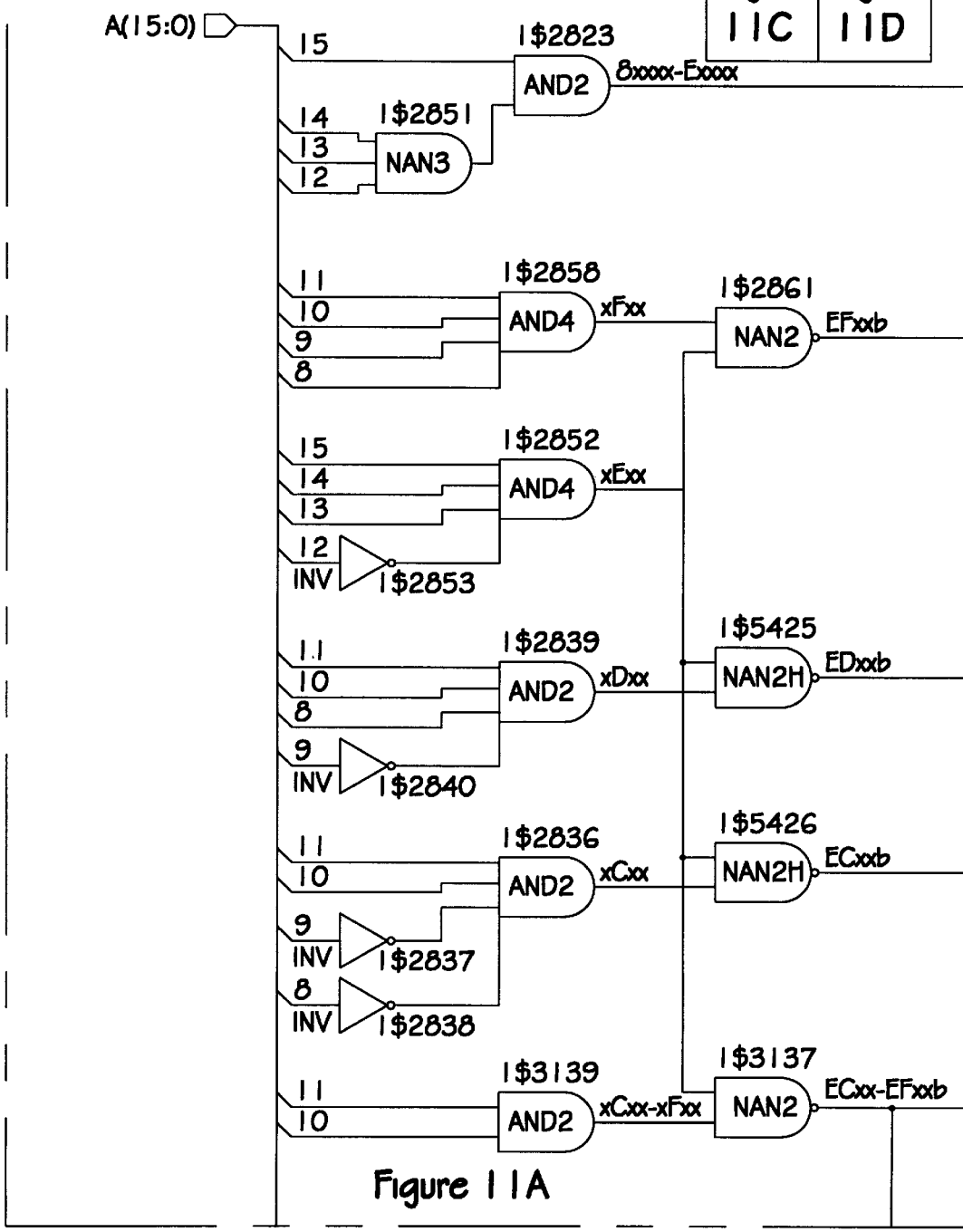
FIG. 11 is an illustration showing details of an embodiment of a first portion microprocessor decode (914) functional block.
Figure 11B:
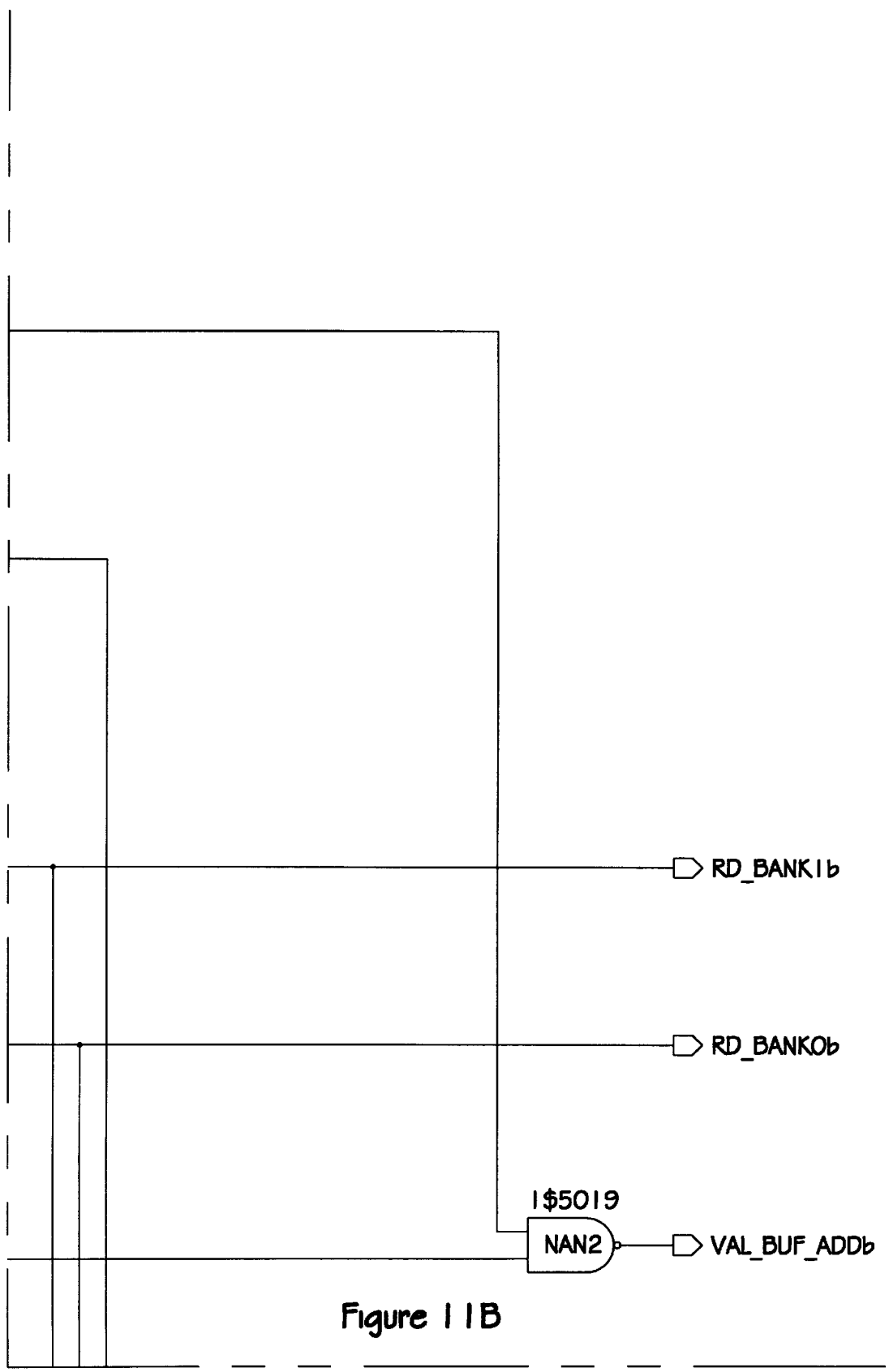
Figure 11C:
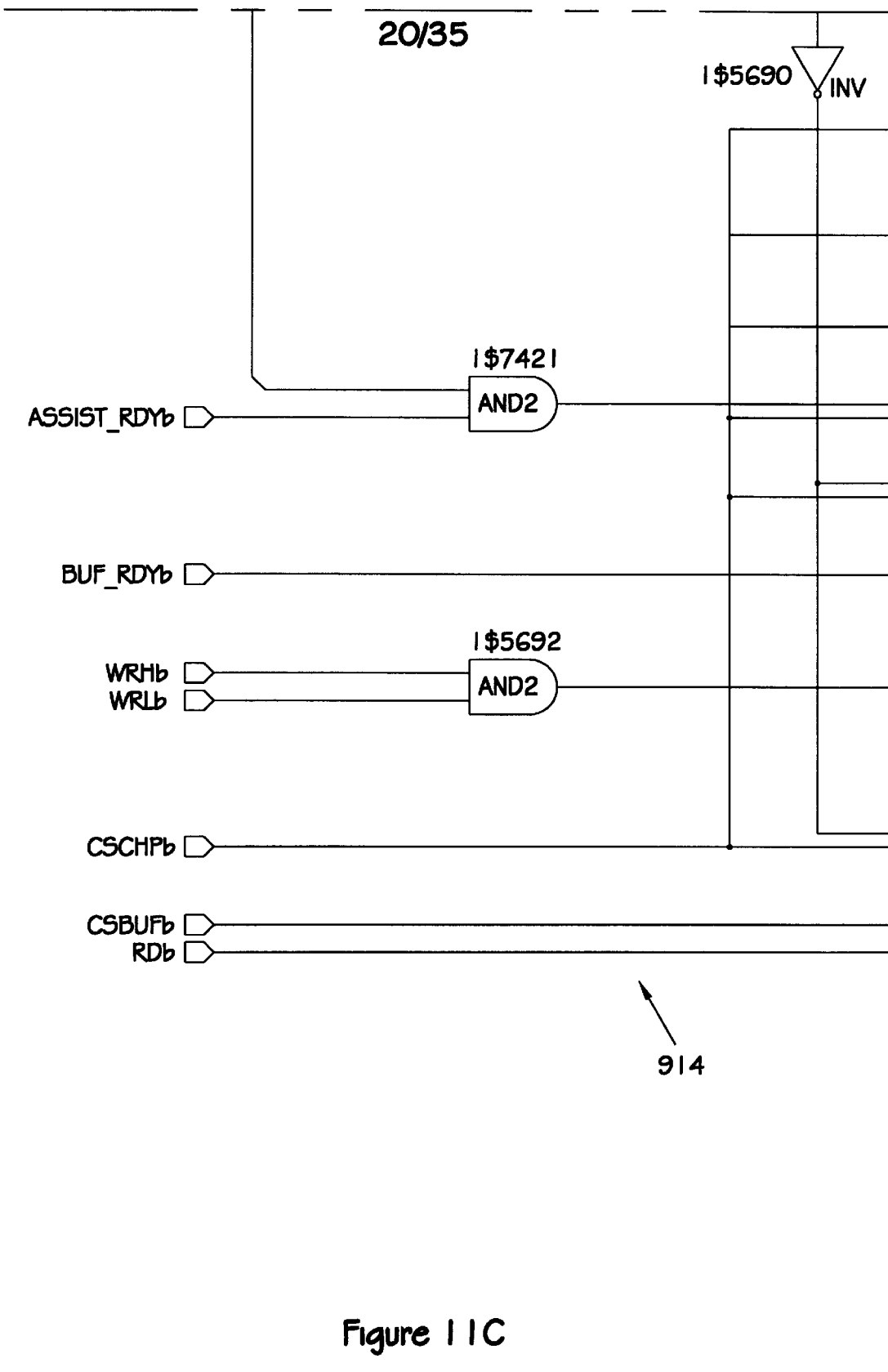
Figure 11D:
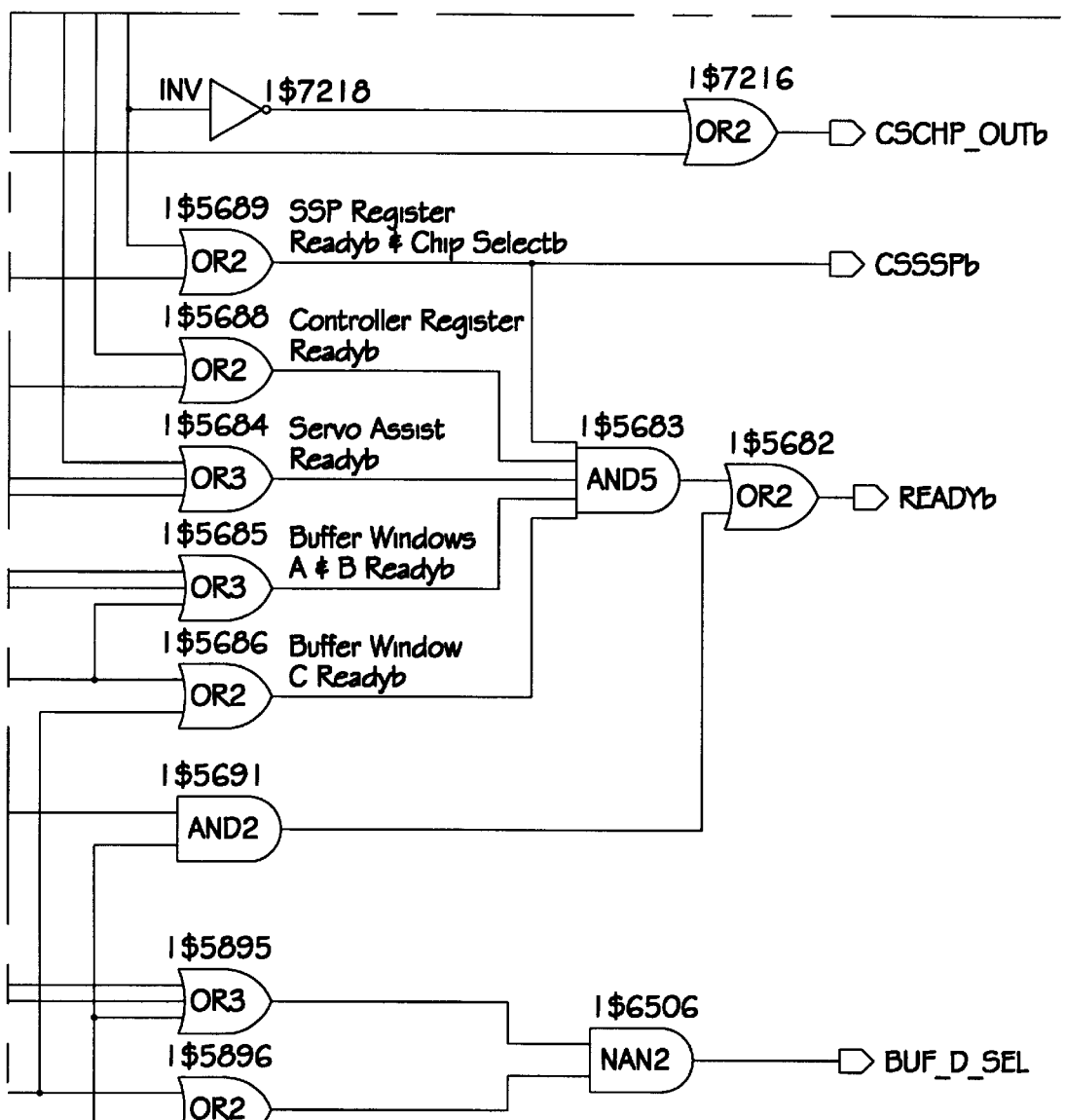
Figure 12B:
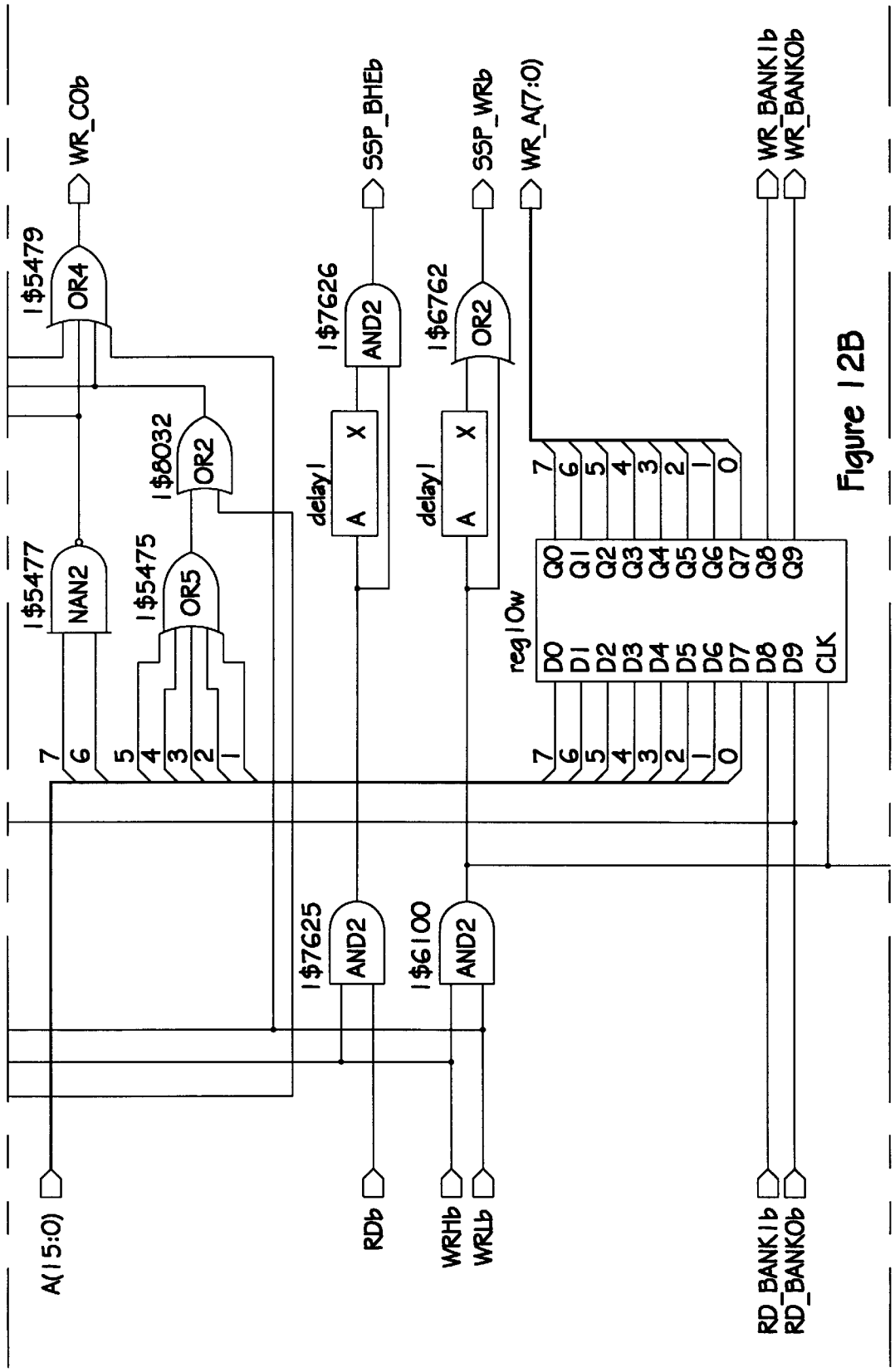
FIG. 12 is an illustration showing details of an embodiment of a second portion microprocessor decode (914) functional block.
Figure 12C:
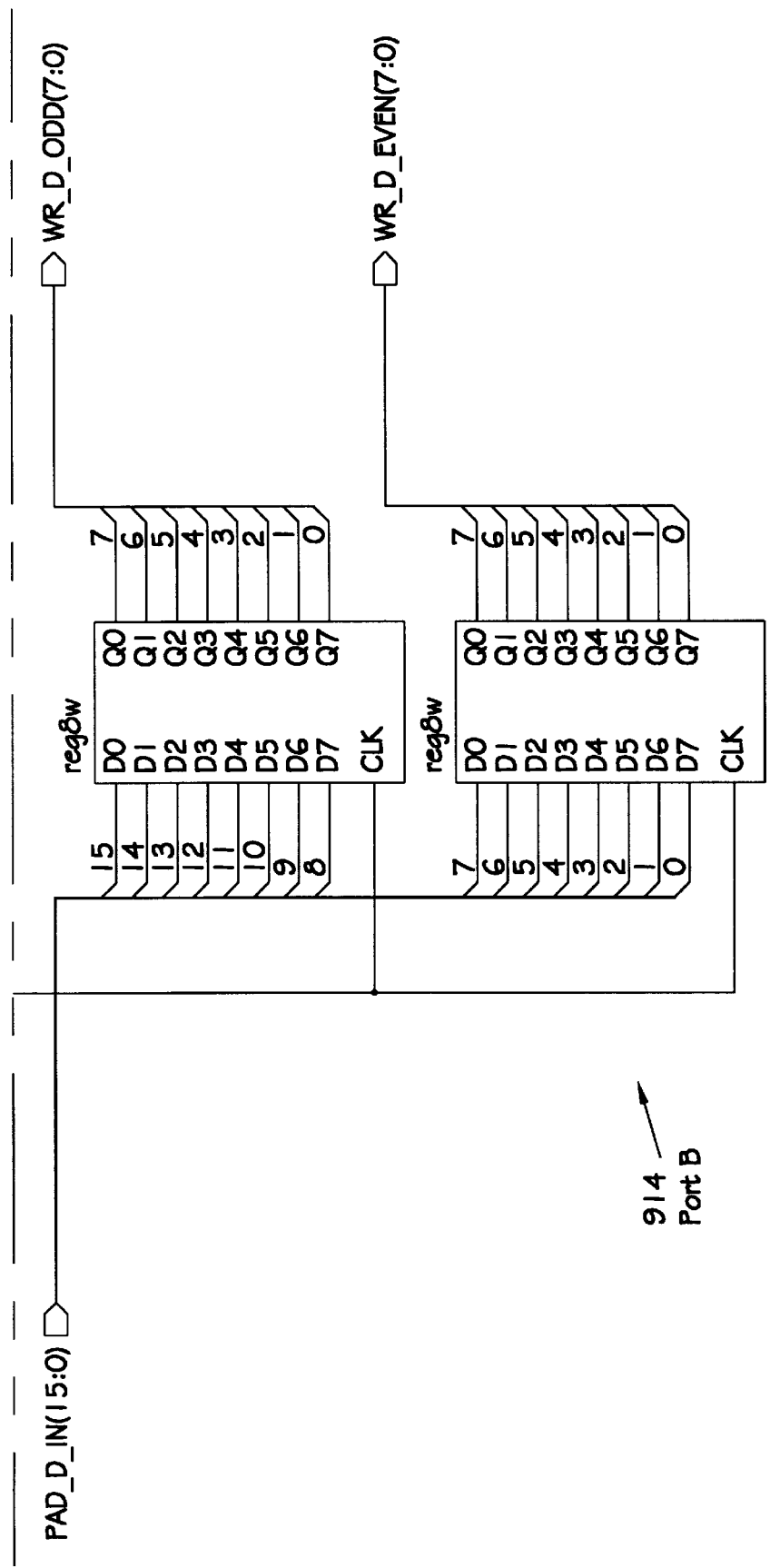
Figure 13B:
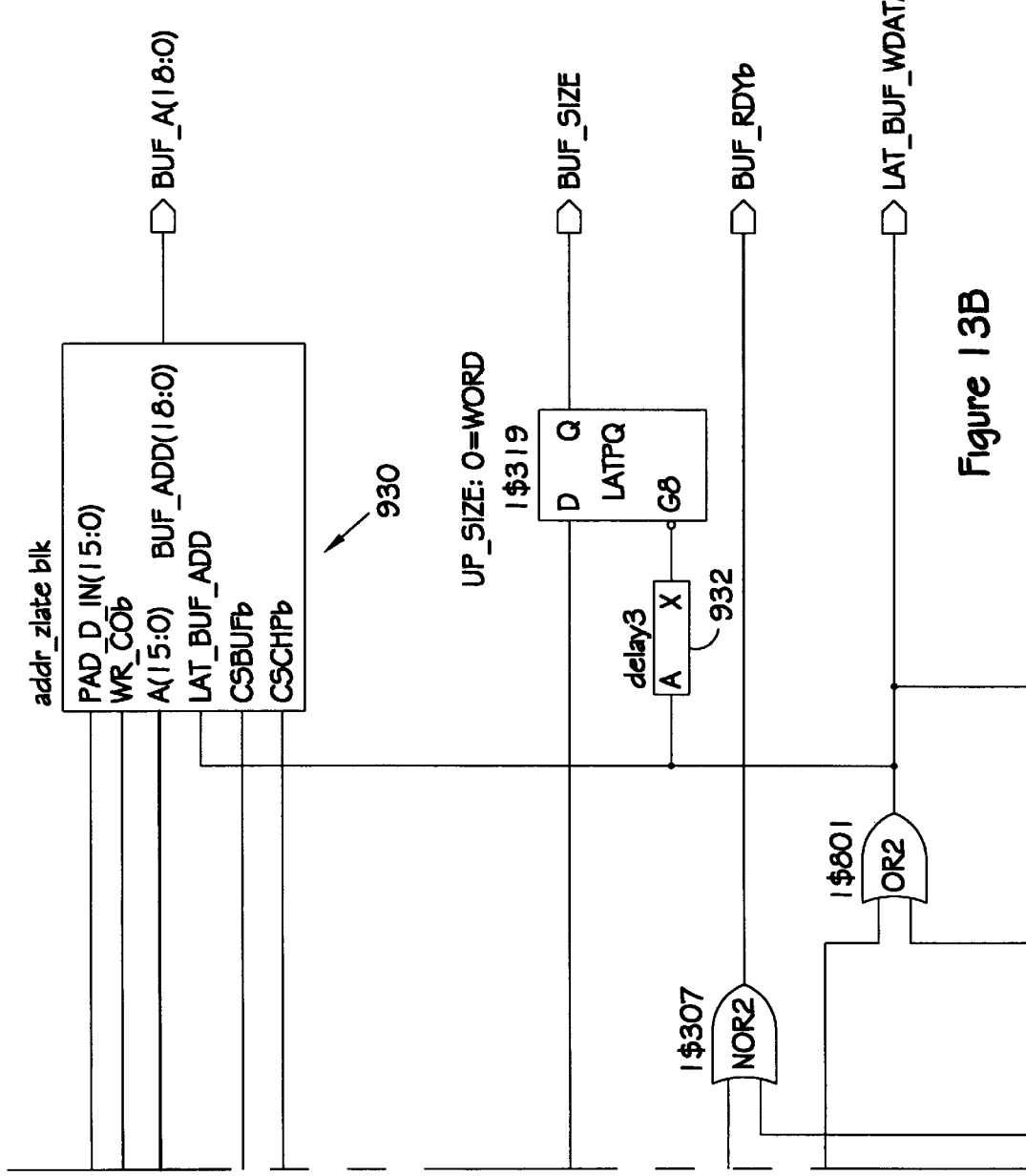
FIG. 13 is an illustration showing details of an embodiment of the buffer control (916) functional block.
Figure 13C:
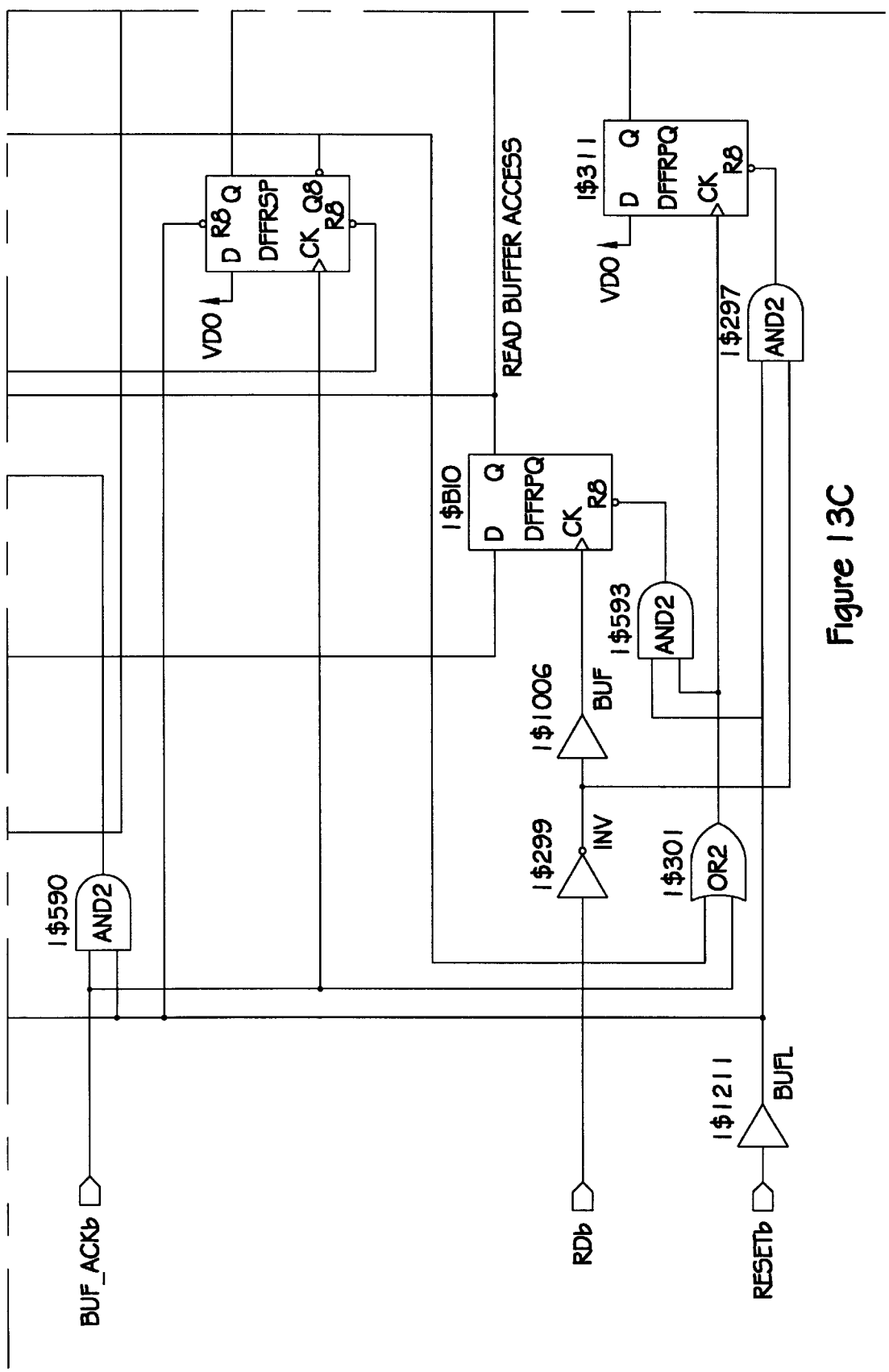
Figure 13D:
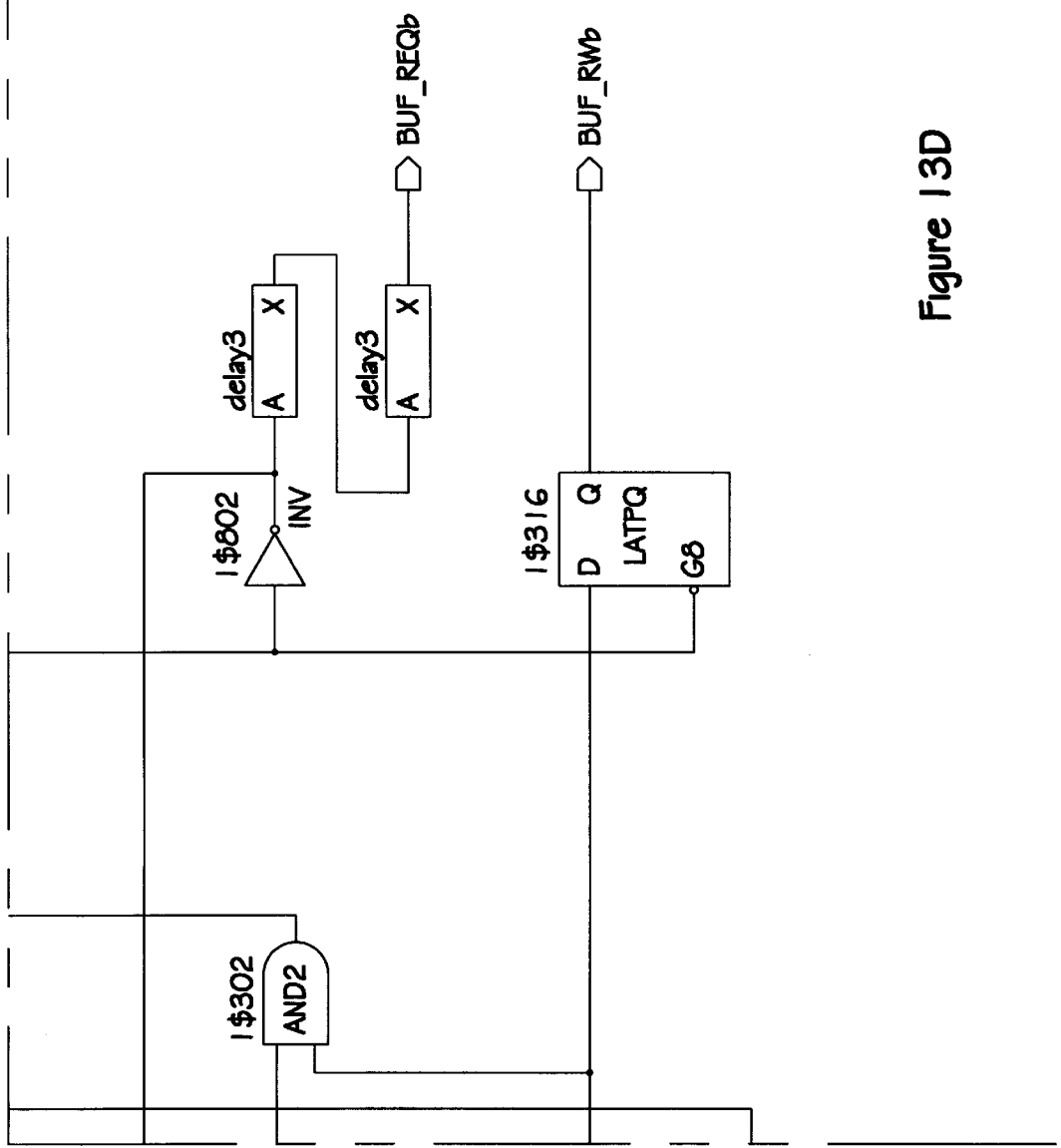
Figure 14A:
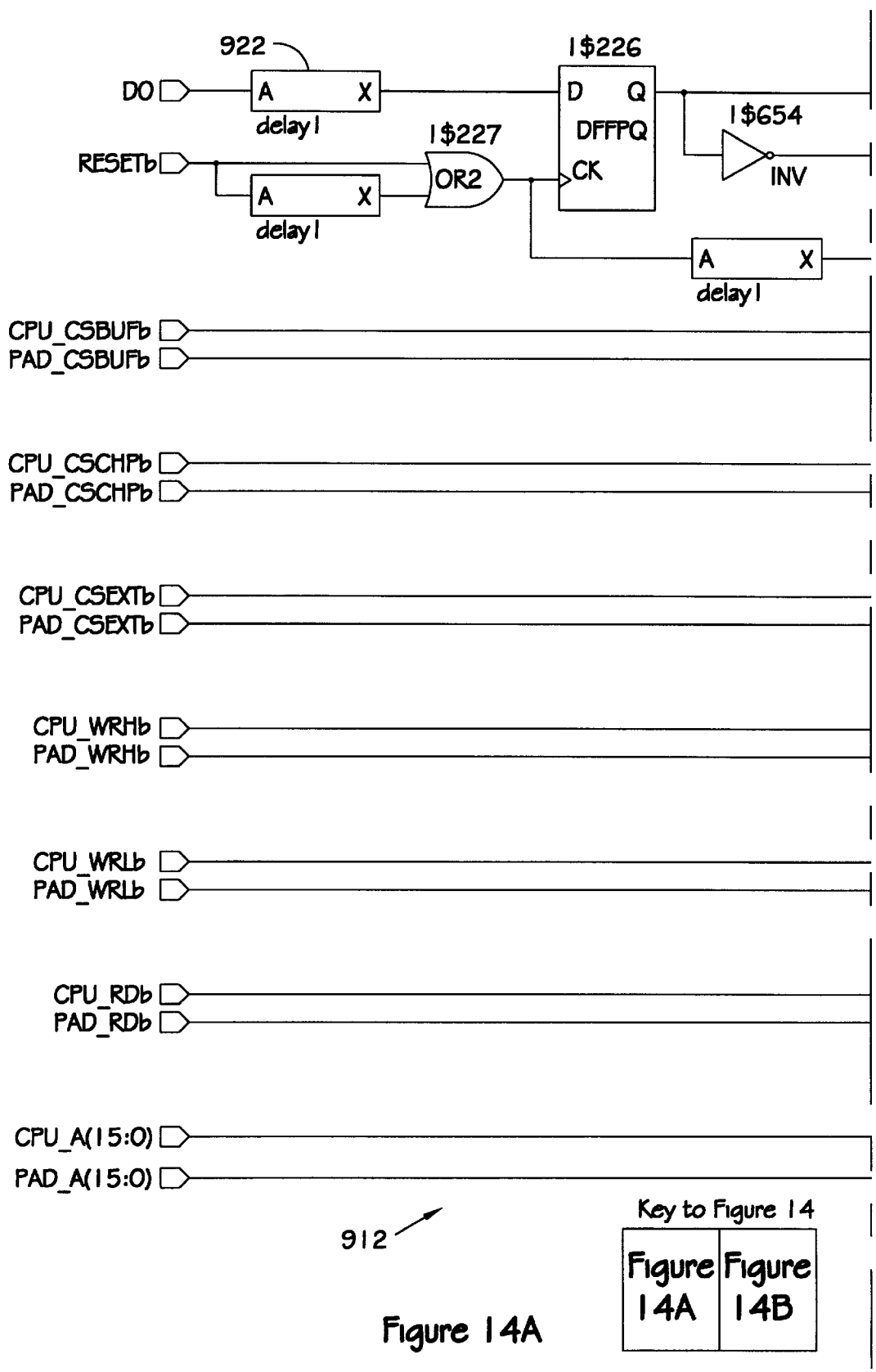
FIG. 14 is an illustration showing details of an embodiment of the control multiplexer functional block 912.
Figure 14B:
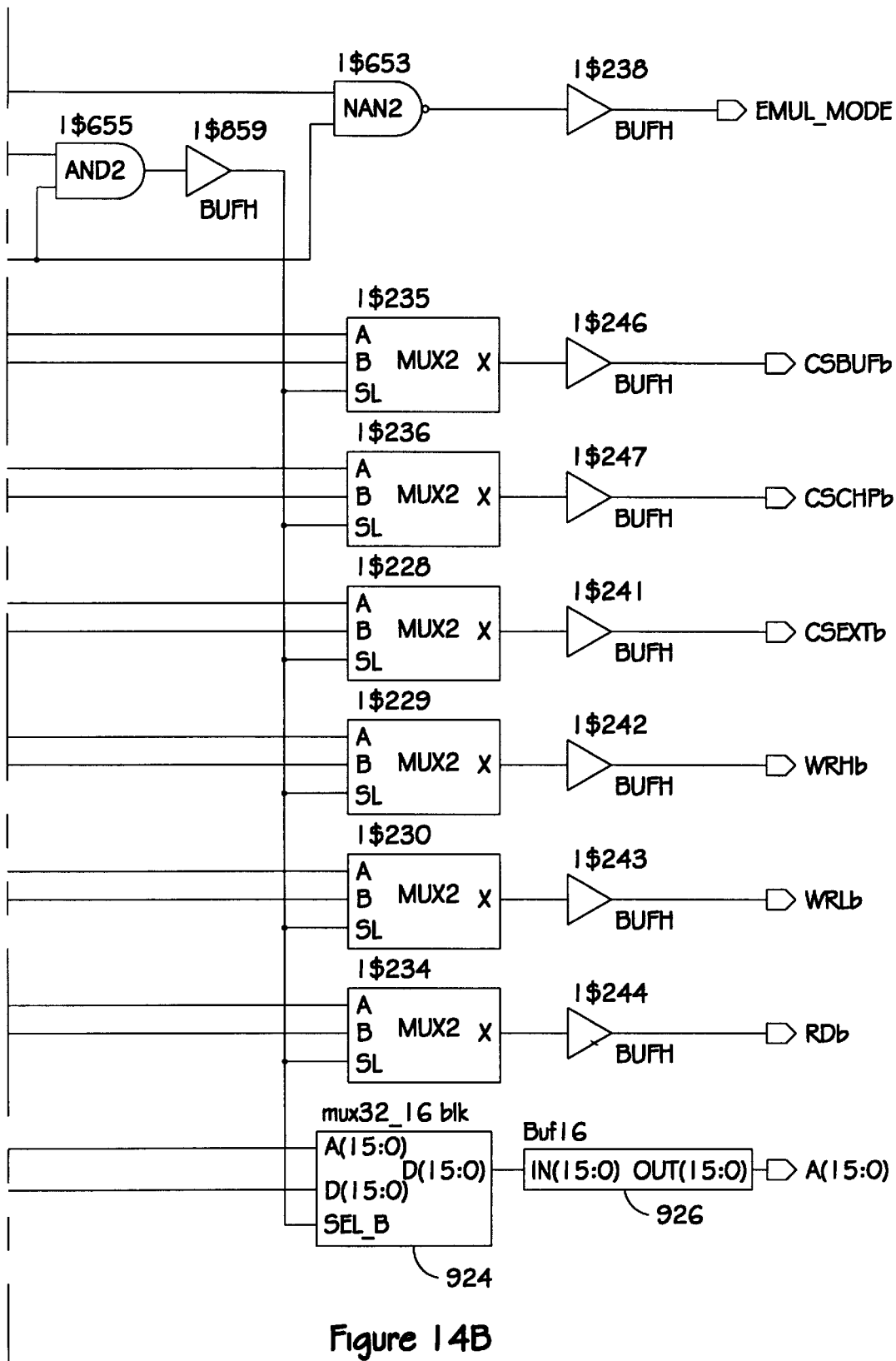
Figure 15:
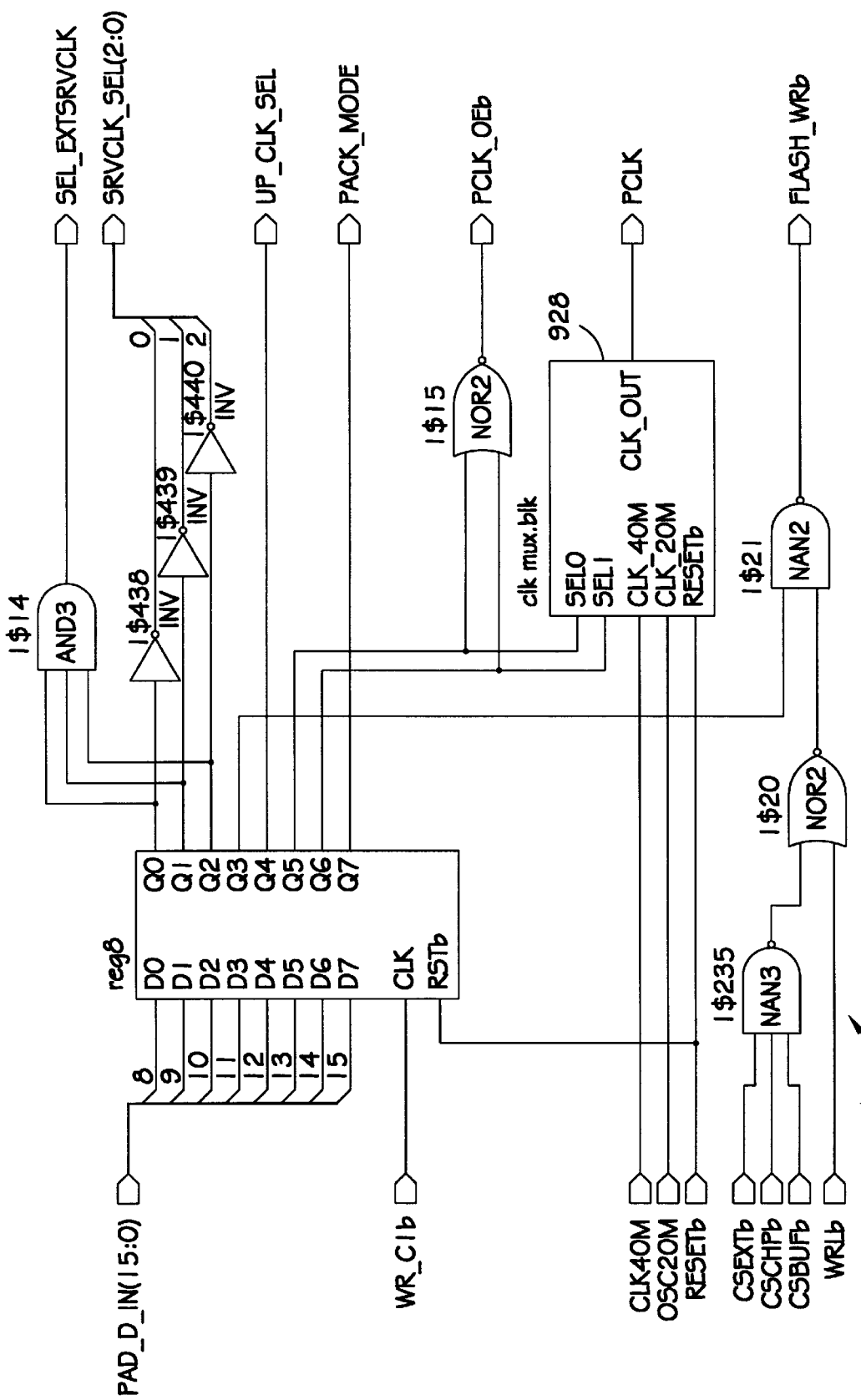
FIG. 15 is an illustration showing details of an embodiment of the clock control (920) functional block.
Figure 16C:
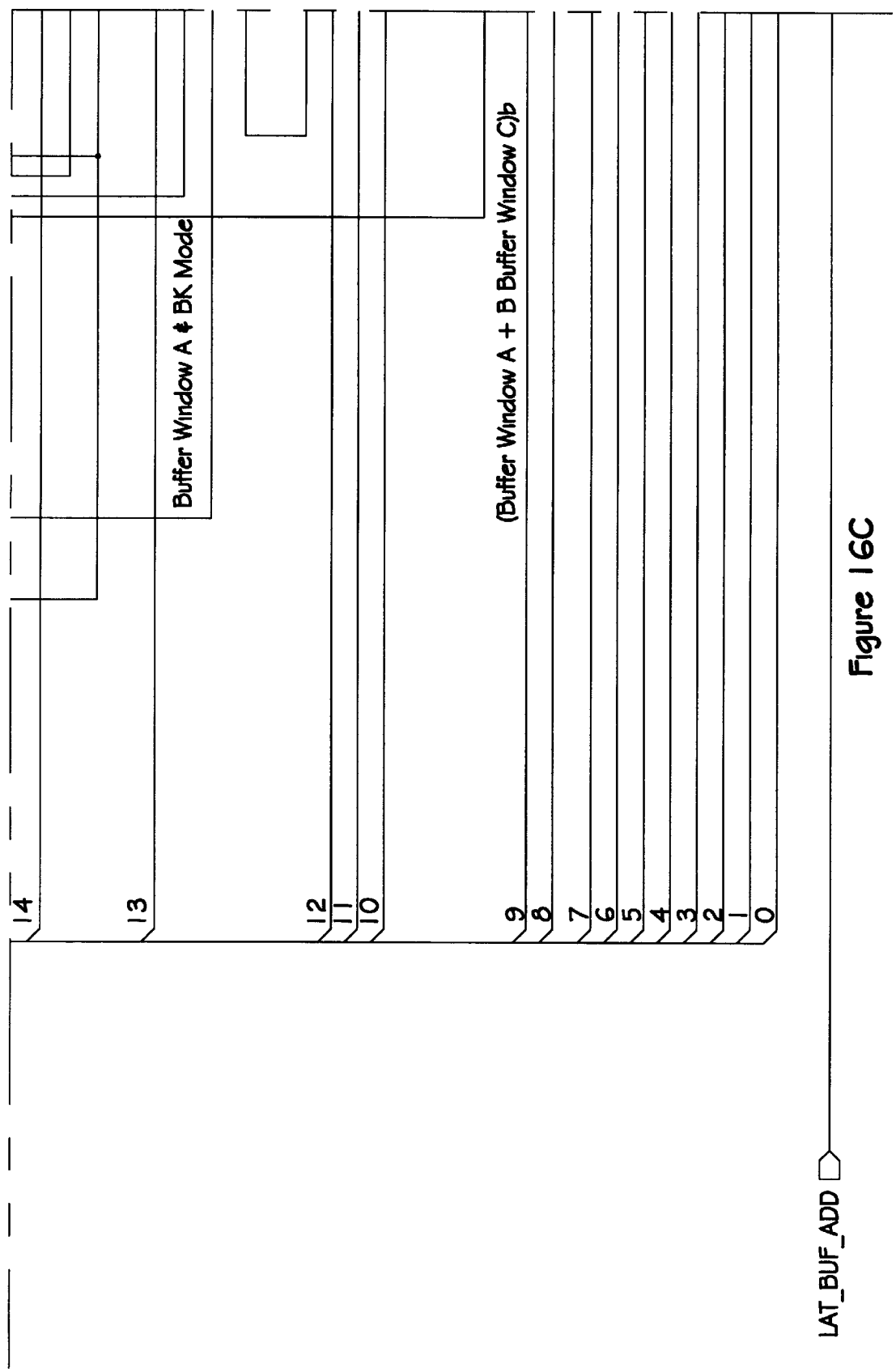
FIG. 16 is an illustration showing details of an embodiment of the address translation (930) functional block.
Figure 16D:
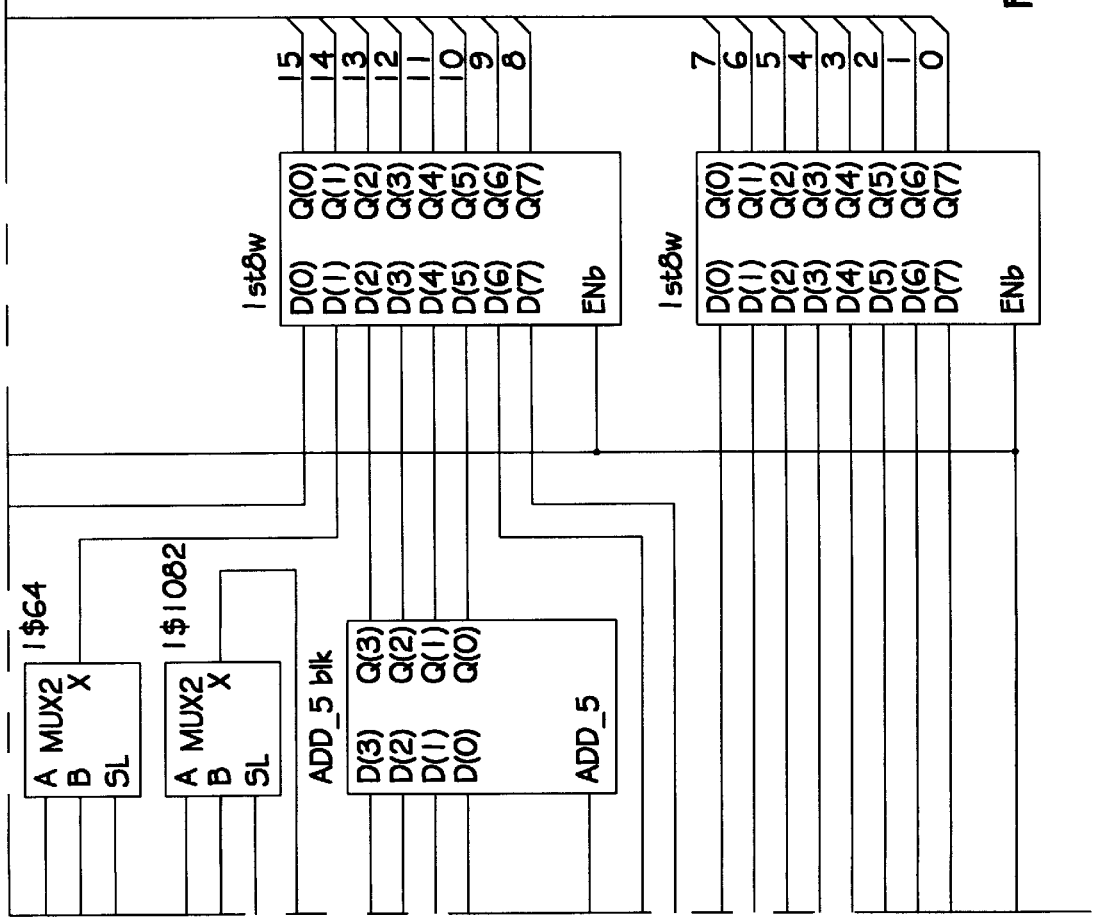

The Disc Controller and Microprocessor Interface Blocks are now described in greater detail relative to FIGS. 7–9. Microprocessor Interface 901 is an external bus peripheral in IMPC 51 that provides access to internal control/configuration/status registers and buffer access within the controller section of IMPC 51. In one embodiment of the invention, microprocessor interface 901 is a 16-bit non-multiplexed connection between the microprocessor core 1001, other functional blocks within IMPC 51, and external devices or circuits, including the control multiplexer block 912 (See FIG. 14), the microprocessor decode block 914 (See FIGS. 11–12), the buffer manager/control block 916 (See FIG. 13), the clock control block 920 (See FIG. 15), and, the data path block 918 (See FIG. 8). The address translation block 930 (See FIG. 16) also resides within the microprocessor interface 901.

Other details of the relationship and interconnection between these blocks, including signals, logic gates, and the like, are shown in FIGS. 9–16. Appendix I contains additional information on the microprocessor and interfaces to other internal and external systems or components.

Two external bus chip select signals (CSCHPb and CSBUFb) are used to access memory storage. The first signal, Chip Select Chip (CSCHPb), is used to select the Controller Registers internal to the IMPC 51, the SSP Registers, and first and second buffer windows. The second signal, Chip Select Signal (CSBUFb), is used for third buffer window accesses to the external Buffer Memory 52.

The buffer windows (e.g. Windows A, B, C) provide three CPU address windows into memory. All three access the memory; however, the CPU uses each one of the address windows for a different purpose. For example, Code ROM, CPU Registers and Buffer. One or more of the Buffer Windows may be mapped onto the memory address space. A memory map, and the mapping process it represents, also shows the manner in which specific addresses within the CPU Registers and Buffer are allocated between various buffer windows control registers, special purpose registers, and microprocessor core registers 321, among others. Provision of the chip select signals (e.g. CSCHPb and CSBUFb) provide also increase performance since they facilitate a direct connection to buffer memory 52.

Microprocessor interface logic (MIL) 901 controls the state of the READYb connection to the internal CPU. an some embodiments, an external pin or pins may optionally be provided for use in emulation and/or debugging.) The Buffer 52 accesses and the Servo Assistant 601 may have variable wait states added. Wait states are typically about 40–50 nanosecond each. Added wait states are important because the CPU bus cycle cannot terminate until data is available. In the case of the Buffer 52, wait states are dependent on buffer port contingent/access issues; the Servo Assistant 601 adds wait states based on, for example the multiply/accumulate processing time.

The Microprocessor Interface 901 provides three different Buffer Windows for direct connection to buffer memory 52. In the exemplary embodiment, the accesses to memory are provided as follows: Window A is an 8K/16K byte cached window meant for access to any location in data buffer 52. The buffer start address for this window is programmable on 8K/16K address boundaries. Window B is an 11 Kbyte window intended for storage of variable values. In one particular exemplary embodiment of the invention, Window B always view the top 11K of the buffer. Window C is a 64 KByte window intended for loading and running code sections. Window C in this particular exemplary embodiment of the invention always views the top 64K of the buffer. The top 11K of this window overlaps with window B in the buffer memory. Of course more or fewer windows may be provided, and their sizes and address boundaries may be configured as appropriate.

Further details of an embodiment of the inventive microprocessor interface are now described with respect to FIGS. 8–9, with particular reference to FIG. 8 which shows the relationship between the CPU core 1001 and the microprocessor interface 901 and FIG. 9, which shows some of the major microprocessor interface 901 functional sub-blocks 912, 914, 916, 918, and 920.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX I

Section 1: ST10R100 Microprocessor
Section 2: ST10FERRARI
Section 3: FERRARI TIMING

We claim:

1. In a computer system including a disc drive and a buffer memory, an integrated controller/processor comprising:
   a semiconductor substrate;
   a disc/servo controller, including disc read/write and servo control elements on said semiconductor substrate and a plurality of internal controller registers;
   a processor coupled for communication with said buffer memory via a signal path excluding said read/write control elements;
   an external bus peripheral interface between said processor, said disc/servo controller, and said buffer memory that provides access to said internal registers and access to said buffer memory; and
   means for generating first and second external select signals, said first select signal for selecting said internal controller registers, said second select signal for selecting said buffer memory.

2. The integrated controller/processor of claim 1, wherein said means for generating first and second external select signals further comprises:
   a select signal generating circuit generating said first and second external select signals.

3. The computer system of claim 1, wherein said internal registers are registers adapted to store control information, configuration information, and status information.

4. A controller coupling a disc drive to a host computer for controlling read/write operations of said disc drive, said controller comprising:
   a semiconductor substrate;
   disc controller logic on said semiconductor substrate including a buffer memory manager coupled to an external buffer memory having a plurality of buffer registers prioritizing and arbitrating buffer memory access requests for read and write operations to and from said buffer memory;
   a plurality of internal controller registers for storing information;
   a single microprocessor core on said semiconductor substrate having direct access to said buffer memory through said buffer memory manager and communicating directly with said buffer registers in said buffer memory and with said plurality of internal controller registers via a direct communication path without involvement of said disc controller logic; and
   a processor interface providing access by said microprocessor core to said internal controller registers and access to said buffer memory by a non-multiplexed connection between said microprocessor core and said disc controller logic.

5. A controller as in claim 4, further comprising a code memory separate from said buffer memory coupled to said microprocessor for storing code to be executed.

6. A controller as in claim 4, wherein said processor interface comprises a non-multiplexed connection between said microprocessor core, a control multiplexer unit, a processor decode unit, said buffer manager, a clock control unit, and a data path unit.

7. A controller as in claim 4, wherein said microprocessor is the only microprocessor in an electronic portion of said disc drive.

8. A computer system as in claim 1, wherein said first and second select signals are used to access memory storage; said first select signal being used to select the controller registers internal to the integrated controller/processor, a SSP register, and first and second buffer windows; said second select signal being used for third buffer window accesses to said external buffer memory.

9. A computer system as in claim 8, wherein said buffer windows provide three processor address windows into memory, a first address window for code ROM, a second address window for processor registers, and a third address window for processor registers and buffer; said select signals increasing performance by facilitating direct connection to said buffer memory.

10. An integrated controller/processor as in claim 1, further comprising a code memory separate from said buffer memory coupled to said microprocessor for storing code to be executed.

11. An integrated single-chip controller/processor as in claim 2, further comprising a code memory separate from said buffer memory coupled to said microprocessor for storing code to be executed.

* * * * *